United States Patent
Chow et al.

(10) Patent No.: US 6,842,862 B2
(45) Date of Patent: Jan. 11, 2005

(54) TAMPER RESISTANT SOFTWARE ENCODING

(75) Inventors: Stanley T. Chow, Nepean (CA); Harold J. Johnson, Nepean (CA); Yuan Gu, Kanata (CA)

(73) Assignee: Cloakware Corporation, Ottawa (CA)

(*) Notice: Subject to any disclaimer, the term of this patent is extended or adjusted under 35 U.S.C. 154(b) by 190 days.

(21) Appl. No.: 10/340,410

(22) Filed: Jan. 10, 2003

(65) Prior Publication Data
US 2003/0221121 A1 Nov. 27, 2003

Related U.S. Application Data

(62) Division of application No. 09/329,117, filed on Jun. 9, 1999, now Pat. No. 6,594,761.

(51) Int. Cl.[7] ............................................. G06F 1/24
(52) U.S. Cl. ................. 713/190; 713/189; 713/194; 713/200; 713/201; 713/165; 713/166; 713/187
(58) Field of Search ................................ 713/190, 189, 713/194, 200, 201, 165, 166, 187

(56) References Cited

U.S. PATENT DOCUMENTS

| | | |
|---|---|---|
| 5,123,045 A | 6/1992 | Ostrovsky et al. |
| 5,509,070 A | 4/1996 | Schull |
| 5,659,754 A | 8/1997 | Grove et al. |
| 5,666,411 A | 9/1997 | McCarty |
| 5,748,741 A | 5/1998 | Johnson et al. |
| 5,768,596 A | 6/1998 | Chow et al. |

FOREIGN PATENT DOCUMENTS

| | | |
|---|---|---|
| EP | 0774714 A2 | 5/1997 |
| EP | 0774714 A3 | 6/1999 |
| WO | WO 97/04394 | 2/1997 |
| WO | WO 98/33296 | 7/1998 |
| WO | WO 99/01815 | 1/1999 |

OTHER PUBLICATIONS

Frederick B. Cohen, "Operating System Protection Through Program Evolution", 1993, Elsevier Science Publishers Ltd., pp. 565–584.

Christian Collberg, et al., "Manufacturing Cheap, Resilient, and Stealthy Opaque Constructs", Department of Computer Science, The University of Auckland, Auckland, New Zeland.

(List continued on next page.)

*Primary Examiner*—Thomas R. Peeso
(74) *Attorney, Agent, or Firm*—Cassan Maclean

(57) ABSTRACT

The present invention relates generally to computer software, and more specifically, to a method and system of making computer software resistant to tampering and reverse-engineering. "Tampering" occurs when an attacker makes unauthorized changes to a computer software program such as overcoming password access, copy protection or timeout algorithms. Broadly speaking, the method of the invention is to increase the tamper-resistance and obscurity of computer software code by transforming the data flow of the computer software so that the observable operation is dissociated from the intent of the original software code. This way, the attacker can not understand and decode the data flow by observing the execution of the code. A number of techniques for performing the invention are given, including encoding software arguments using polynomials, prime number residues, converting variables to new sets of boolean variables, and defining variables on a new n-dimensional vector space.

45 Claims, 10 Drawing Sheets

OTHER PUBLICATIONS

David Aucsmith, et al., Intel Architecture Labs, "Tamper Resistant Software: An Implementation", Proceedings of the First Internatiional Workshop on Information Hiding, 1996, Cambridge, U.K., pp. 1–10.

Vega Technologies, Inc., "JZipper—a better way to jar Java classes," Jul. 9, 1999, pp. 1–3.

"A Java bytecode obfuscator", promotional materials, (www.monmouth.com/~neil/Obfuscate.html), Jun. 2, 1998, pp. 1–4.

Eastridge Technology, "Jshrink: Java Shrinker and Obfuscator", promotional materials, (www.e–t.com/jshrinkdoc.html), Jun. 2. 1998, pp. 1–4.

Zelix KlassMaster, "It's a $2^{nd}$ Generation Java Obfuscator", promotional materials, (www.zelix.com/klassmaster/feature3.html), pp. 1–4.

The art of obfuscation, promotional materials (www.cwi.nl/~ tromp/maze/html), Jun. 2, 1998, pp. 1–5.

True Obfuscation, promotional materials (www.preemptive.com/DashO/obfuscate.html), Jun. 2, 1998, pp. 1–3.

Obfuscator, "tech tools. *;//free tools for java", promotional materials (www.sbktech.org/hashjava_old.html), Jun. 2, 1998, pp. 1–9.

"Number–Theoretic Algorithms", Chapter 33, pp. 801–830.

TAMPER RESISTANT SOFTWARE ENCODING

This is a divisional application of U.S. patent application Ser. No. 09/329,117, filed Jun. 9, 1999 now U.S. Pat. No. 6,594,761 entitled "Tamper Resistant Software Encoding".

The present invention relates generally to computer software, and more specifically, to a method and system of making computer software resistant to tampering and reverse-engineering.

BACKGROUND OF THE INVENTION

The market for computer software in all of its various forms is recognized to be very large and is growing everyday. In industrialized nations, hardly a business exists that does not rely on computers and software either directly or indirectly, in their daily operations. As well, with the expansion of powerful communication networks such as the Internet, the ease with which computer software may be exchanged, copied and distributed is also growing daily.

With this growth of computing power and communication networks, a user's ability to obtain and run unauthorized or unlicensed software is becoming less and less difficult, and a practical means of protecting such computer software has yet to be devised.

Computer software is generally written by software developers in a high-level language which must be compiled into low-level object code in order to execute on a computer or other processor.

High-level computer languages use command wording that closely mirrors plain language, so they can be easily read by one skilled in the art. Typically, source code files have a suffix that identifies the corresponding language. For example, Java™ is a currently popular high-level language and its source code typically carries a name such as "prog1.java". High-level structure refers to, for example, the class hierarchy of object oriented programs, or the module structure in Ada™ programs.

Object-code generally refers to machine-executable code, which is the output of a software compiler that translates source code from human-readable to machine-executable code. In the case of Java™, there is one file per class and the files have names such as "className.class", where "className" is the name of the class. Such files are generally called ".class files".

The low-level structure of object code refers to the actual details of how the program works. Low-level analysis usually focuses on, or at least begins with, one routine at a time. This routine may be, for example, a procedure, function or method. Analysis of individual routines may be followed by analyses of wider scope in some compilation tool sets.

The low-level structure of a software program is usually described in terms of its data flow and control flow. Data-flow is a description of the variables together with the operations performed on them. Control-flow is a description of how control jumps from place to place in the program during execution, and the tests that are performed to determine those jumps.

Tampering refers to changing computer software in a manner that is against the wishes of the original author. Traditionally, computer software programs have had limitations encoded into them, such as requiring password access, preventing copying, or allowing the software only to execute a predetermined number of times or for a certain duration. However, because the user has complete access to the software code, methods have been found to identify the code administering these limitations. Once this coding has been identified, the user is able to overcome these programmed limitations by modifying the software code.

Since a piece of computer software is simply a listing of data bits, ultimately, one cannot prevent attackers from making copies and making arbitrary changes. As well, there is no way to prevent users from monitoring the computer software as it executes. This allows the user to obtain the complete data-flow and control-flow, so it was traditionally thought that the user could identify and undo any protection. This theory seemed to be supported in practice. This was the essence of the copy-protection against hacking war that was common on Apple-II and early PC software, and has resulted in these copy-protection efforts being generally abandoned.

Since then, a number of attempts have been made to prevent attacks by "obfuscating" or making the organisation of the software code more confusing and hence, more difficult to modify. Software is commercially available to "obfuscate" source in code in manners such as:

- globally replacing variable names with random character strings. For example, each occurrence of the variable name "SecurityCode" could be replaced with the character string "1xcd385mxc" so that it is more difficult for an attacker to identify the variables he is looking for;
- deleting comments and other documentation; and
- removing source-level structural indentations, such as the indentation of loop bodies, to make the loops more difficult to read.

While these techniques obscure the source code, they do not make any attempts to deter modification. Once the attacker has figured out how the code operates, he is free to modify it as he choses.

A more complex approach to obfuscation is presented in issued U.S. Pat. No. 5,748,741 which describes a method of obfuscating computer software by artificially constructing a "complex wall". This "complex wall" is preferably a "cascade" structure, where each output is dependent on all inputs. The original program is protected by merging it with this cascade, by intertwining the two. The intention is to make it very difficult for the attacker to separate the original program from the complex wall again, which is necessary to alter the original program. This system suffers from several major problems:

- large code expansion, exceeding a hundred fold, required to create a sufficiently elaborate complex wall, and to accommodate its intertwining with the original code; and
- low security since the obfuscated program may be divided into manageable blocks which may be de-coded individually, allowing the protection to be removed one operation at a time.

Other researchers are beginning to explore the potential for obfuscation in ways far more effective than what is achieved by current commercial code obfuscators, though still inferior to the obfuscation of issued U.S. Pat. No. 5,748,741. For example, in their paper *"Manufacturing cheap, resilient, and stealthy opaque constructs"*, Conference on Principles of Programming Languages (POPL), 1998[ACM 0-89791-979-3/98/01], pp. 184–196, C. Collburg, C. Thomborson, and D. Low propose a number of ways of obscuring a computer program. In particular, Collburg et al. disclose obscuring the decision process in the program, that is, obscuring those computations on which binary or multiway conditional branches determine their branch targets. Clearly, there are major deficiencies to this approach, including:

because only control-flow is being addressed, domain transforms are not used and data obfuscation is weak; and there is no effort to provide tamper-resistance. In fact, Collburg et al. do not appear to recognize the distinction between tamper-resistance and obfuscation, and as a result, do not provide any tamper-proofing at all.

The approach of Collburg et al. is based on the premise that obfuscation can not offer a complete solution to tamper protection. Collburg et al. state that: ". . . code obfuscation can never completely protect an application from malicious reverse-engineering efforts. Given enough time and determination, Bob will always be able to dissect Alice's application to retrieve its important algorithms and data structures."

As noted above, it is desirable to prevent users from making small, meaningful changes to computer programs, such as overriding copy protection and timeouts in demonstration software. It is also necessary to protect computer software against reverse engineering which might be used to identify valuable intellectual property contained within a software algorithm or model. In hardware design, for example, vendors of application specific integrated circuit (ASIC) cell libraries often provide precise software models corresponding to the hardware, so that users can perform accurate system simulations. Because such a disclosure usually provides sufficient detail to reveal the actual cell design, it is desirable to protect the content of the software model.

In other applications, such as emerging encryption and electronic signature technologies, there is a need to hide secret keys in software programs and transmissions, so that software programs can sign, encrypt and decrypt transactions and other software modules. At the same time, these secret keys must be protected against being leaked.

There is therefore a need for a method and system of making computer software resistant to tampering and reverse engineering. This design must be provided with consideration for the necessary processing power and real time delay to execute the protected software code, and the memory required to store it.

SUMMARY OF THE INVENTION

It is therefore an object of the invention to provide a method and system of making computer software resistant to tampering and reverse engineering which addresses the problems outlined above.

The method and system of the invention recognizes that attackers cannot be prevented from making copies and making arbitrary changes. However, the most significant problem is "useful tampering" which refers to making small changes in behaviour. For example, if the trial software was designed to stop working after ten invocations, tampering that changes the "ten" to "hundred" is a concern, but tampering that crashes the program totally is not a priority since the attacker gains no benefit.

Data-flow describes the variables together with operations performed on them. The invention increases the complexity of the data-flow by orders of magnitude, allowing "secrets" to be hidden in the program, or the algorithm itself to be hidden. "Obscuring" the software coding in the fashion of known code obfuscators is not the primary focus of the invention. Obscurity is necessary, but not sufficient for, achieving the prime objective of the invention, which is tamper-proofing.

One aspect of the invention is broadly defined as a method of increasing the tamper-resistance and obscurity of computer software code comprising the steps of transforming the data flow in the computer software code to dissociate the observable operation of the transformed the computer software code from the intent of the original software code.

A second aspect of the invention is broadly defined as a method of increasing the tamper-resistance and obscurity of computer software code comprising the steps of encoding the computer software code into a domain which does not have a corresponding semantic structure, to increase the tamper-resistance and obscurity of the computer software code.

A further aspect of the invention is defined as a computer readable memory medium, storing computer software code executable to perform the steps of: compiling the computer software program from source code into a corresponding set of intermediate computer software code; encoding the intermediate computer software code into tamper-resistant intermediate computer software code having a domain which does not have a corresponding semantic structure, to increase the tamper-resistance and obscurity of the computer software code; and compiling the tamper-resistant intermediate computer software code into tamper-resistant computer software object code.

An additional aspect of the invention is defined as a computer data signal embodied in a carrier wave, the computer data signal comprising a set of machine executable code being executable by a computer to perform the steps of: compiling the computer software program from source code into a corresponding set of intermediate computer software code; encoding the intermediate computer software code into tamper-resistant intermediate computer software code having a domain which does not have a corresponding semantic structure, to increase the tamper-resistance and obscurity of the computer software code; and compiling the tamper-resistant intermediate computer software code into tamper-resistant computer software object code.

Another aspect of the invention is defined as an apparatus for increasing the tamper-resistance and obscurity of computer software code, comprising front end compiler means for compiling the computer software program from source code into a corresponding set of intermediate computer software code; encoding means for encoding the intermediate computer software code into tamper-resistant intermediate computer software code having a domain which does not have a corresponding semantic structure, to increase the tamper-resistance and obscurity of the computer software code; and back end compiler means for compiling the tamper-resistant intermediate computer software code into tamper-resistant computer software object code.

BRIEF DESCRIPTION OF THE DRAWINGS

These and other features of the invention will become more apparent from the following description in which reference is made to the appended drawings in which.

DETAILED DESCRIPTION OF PREFERRED EMBODIMENTS OF THE INVENTION

The invention lies in a means for recoding software code in such a manner that it is fragile to tampering. Attempts to modify the software code will therefore cause it to become inoperable in terms of its original function. The tamper-resistant software may continue to run after tampering, but no longer performs sensible computation.

The extreme fragility embedded into the program by means of the invention does not cause execution to cease immediately, once it is subjected to tampering. It is desirable for the program to continue running so that, by the time the attacker realizes something is wrong, the modifications and events which caused the functionality to become nonsensical are far in the past. This makes it very difficult for the attacker to identify and remove the changes that caused the failure to occur.

Figure 1:
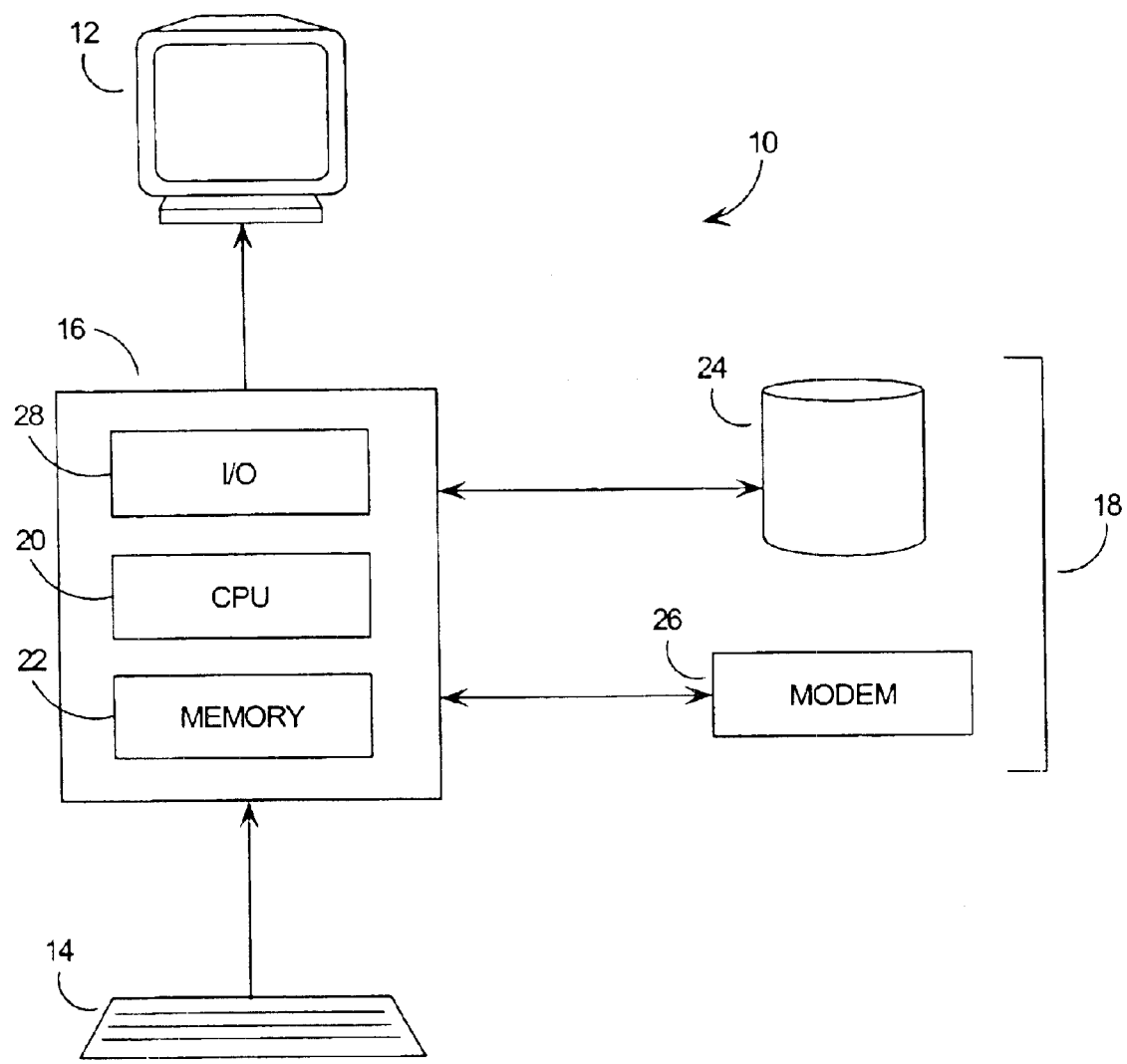
FIG. 1 presents an exemplary computer system in which the invention may be embodied.

An example of a system upon which the invention may be performed is presented as a block diagram in FIG. 1. This computer system 10 includes a display 12, keyboard 14, computer 16 and external devices 18.

The computer 16 may contain one or more processors or microprocessors, such as a central processing unit (CPU) 20. The CPU 20 performs arithmetic calculations and control functions to execute software stored in an internal memory 22, preferably random access memory (RAM) and/or read only memory (ROM), and possibly additional memory 24. The additional memory 24 may include, for example, mass memory storage, hard disk drives, floppy disk drives, magnetic tape drives, compact disk drives, program cartridges and cartridge interfaces such as those found in video game devices, removable memory chips such as EPROM or PROM, or similar storage media as known in the art. This additional memory 24 may be physically internal to the computer 16, or external as shown in FIG. 1.

The computer system 10 may also include other similar means for allowing computer programs or other instructions to be loaded. Such means can include, for example, a communications interface 26 which allows software and data to be transferred between the computer system 10 and external systems. Examples of communications interface 26 can include a modem, a network interface such as an Ethernet card, a serial or parallel communications port. Software and data transferred via communications interface 26 are in the form of signals which can be electronic, electromagnetic, optical or other signals capable of being received by communications interface 26.

Input and output to and from the computer 16 is administered by the input/output (I/O) interface 28. This I/O interface 28 administers control of the display 12, keyboard 14, external devices 18 and other such components of the computer system 10.

The invention is described in these terms for convenience purposes only. It would be clear to one skilled in the art that the invention may be applied to other computer or control systems 10. Such systems would include all manner of appliances having computer or processor control including telephones, cellular telephones, televisions, television set top units, lap top computers, personal digital assistants and automobiles.

Compiler Technology

In the preferred embodiment, the invention is implemented in terms of an intermediate compiler program running on a computer system 10. Standard compiler techniques are well known in the art. Two standard references which may provide necessary background are "Compilers Principles, Techniques, and Tools" 1988 by Alfred Aho, Ravi Sethi and Jeffrey Ullman (ISBN 0-201-1008-6), and "Advanced Compiler Design & Implementation" 1997 by Steven Muchnick (ISBN 1-55860-320-4). The preferred embodiment of the invention is described with respect to static single assignment, which is described in Muchnick.

Figure 2:
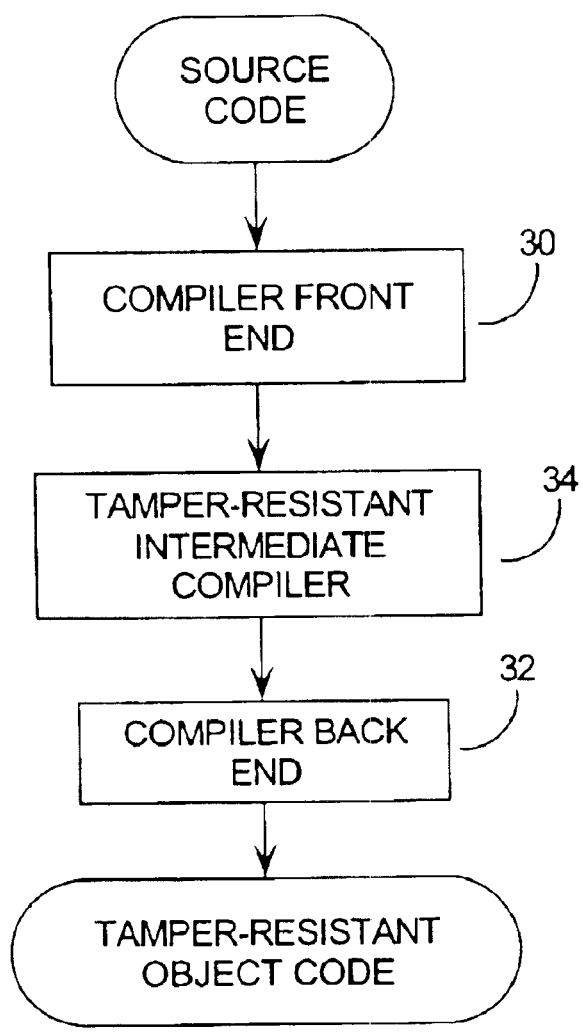
FIG. 2 presents a flow chart of the invention applied to a software compiler in an embodiment of the invention.

FIG. 2 presents an example of such an implementation in a preferred embodiment of the invention. Generally, a software compiler is divided into three components, described as the front end, the middle, and the back end. The front end 30 is responsible for language dependent analysis, while the back end 32 handles the machine-dependent parts of code generation. Optionally, a middle component may be included to perform optimizations that are independent of language and machine. Typically, each compiler family will have only one middle, with a front end 30 for each high-level language and a back end 32 for each machine-level language. All of the components in a compiler family can generally communicate in a common intermediate language so they are easily interchangeable.

The first component of the software compiler is a front end 30, which receives source code, possibly in a high-level language and generates what is commonly described as internal representation or intermediate code. There are many such compiler front ends 30 known in the art.

In the preferred embodiment of the invention, this intermediate code is then encoded to be tamper-resistant by the middle compiler 34 of the invention to make the desired areas of the input software tamper-resistant. The operation of the invention in this manner will be described in greater detail hereinafter.

Finally, the compiler back end 32 receives the tamper-resistant intermediate code and generates object code. The tamper-resistant object code is then available to the user to link and load, thereby creating an executable image of the source code for execution on a computer system 10.

The use of compiler front ends 30 and back ends 32 is well known in the art. Typically, these compiler components are commercially available "off the shelf", although this is not yet the case for Java™, and are suited to particular computer software and computers. For example, if a Compiler Writer wishes to compile a C++ program to operate on a 486 microprocessor, he would pair a front end 30 which compiles high level C++ into intermediate code, with a back end 32 which compiles this intermediate code into object code executable on the 486 microprocessor.

In the preferred embodiment of the invention, the tamper-resistant encoding compiler 34 is implemented with a front-end 30 that reads in Java™ class files and a back end 32 that writes out Java™ class files. However, the invention can easily be implemented using front ends 30 for different languages and machine binaries, and with back ends 32 for different machines or even de-compilers for various source languages. For example, it is likely that an embodiment will be brought to market to compile C source into tamper-resistant C source. Of course, one can also mix-and-match by reading Java™ class files and outputting C source, for example.

In the preferred embodiment of the invention, a standard compiler front end 30 is used to generate intermediate code in static single assignment form which represents the semantics of the program, however any similar semantic representation may be used. To better understand the invention, it is useful to describe some additional terminology relating to static single assignment.

Static Single Assignment and other Flow-Exposed Forms

A middle compiler intended to perform optimization or other significant changes to the way computation is performed, typically uses a form which exposes both control- and data-flow so that they are easily manipulated. Such an intermediate form may be referred to as flow-exposed form.

In particular, Static Single Assignment (SSA) form is a well-known, popular and efficient flow-exposed form used by software compilers as a code representation for performing analyses and optimizations involving scalar variables. Effective algorithms based on Static Single Assignment have been developed to address constant propagation, redundant computation detection, dead code elimination, induction variable elimination, and other requirements.

Static single assignment is a fairly recent way of representing semantics that makes it easy to perform changes on the program. Converting to and from static single assignment is well understood and covered in standard texts like Muchnick. Many optimizations can be performed in static single assignment and can be simpler than the traditional non-static single assignment formulations.

Basically, in static single assignment form, each variable is cloned a number of times, once for each assignment to that variable. This has the advantageous property that each Variable Register (VR) has exactly one place that assigns to it and the operations which consume the value from this particular assignment are exactly known. Each definition of a variable is given a unique version, and different versions of the same variable can be regarded as different program variables. Each use of a variable version can only refer to a single reaching definition. This yields an intermediate representation in which expressions are represented in directed acyclic graph (DAG) form, that is, in tree form, if there are no common subexpressions, and the expression DAGs are associated with statements that use their computed results.

One important property in static single assignment form is that each definition dominates all of its uses in the control flow graph of the program, unless the use is a φ-assignment. A more detailed description of φ-assignments is given hereinafter.

Another important property in static single assignment form is that identical versions of the same variable have the same value on any execution path starting with the initial assignment and not looping back to this assignment. Of course, assignments in loops may assign different values on different iterations, but the property just given still holds.

When several definitions of a variable reach a merging node in the control flow graph of the program, a merge function assignment statement called a phi, or φ, assignment, is inserted to merge them into the definition of a new variable version. This merging is required to maintain the semantics of single reaching definitions. Merge nodes are covered in the standard text books such as Muchnick and the present invention does not require them to be handled any differently.

Of course, the method of the invention could be applied to flow-exposed forms other than SSA, where these provide similar levels of semantic information, as in that provided in Gnu CC. Gnu CC software is currently available at no cost from the Free Software Foundation.

Similarly, the method of the invention could be applied to software in its high level or low level forms, if such forms were augmented with the requisite control- and data-flow information. This flexibility will become clear from the description of the encoding techniques described hereinafter.

Figure 3:
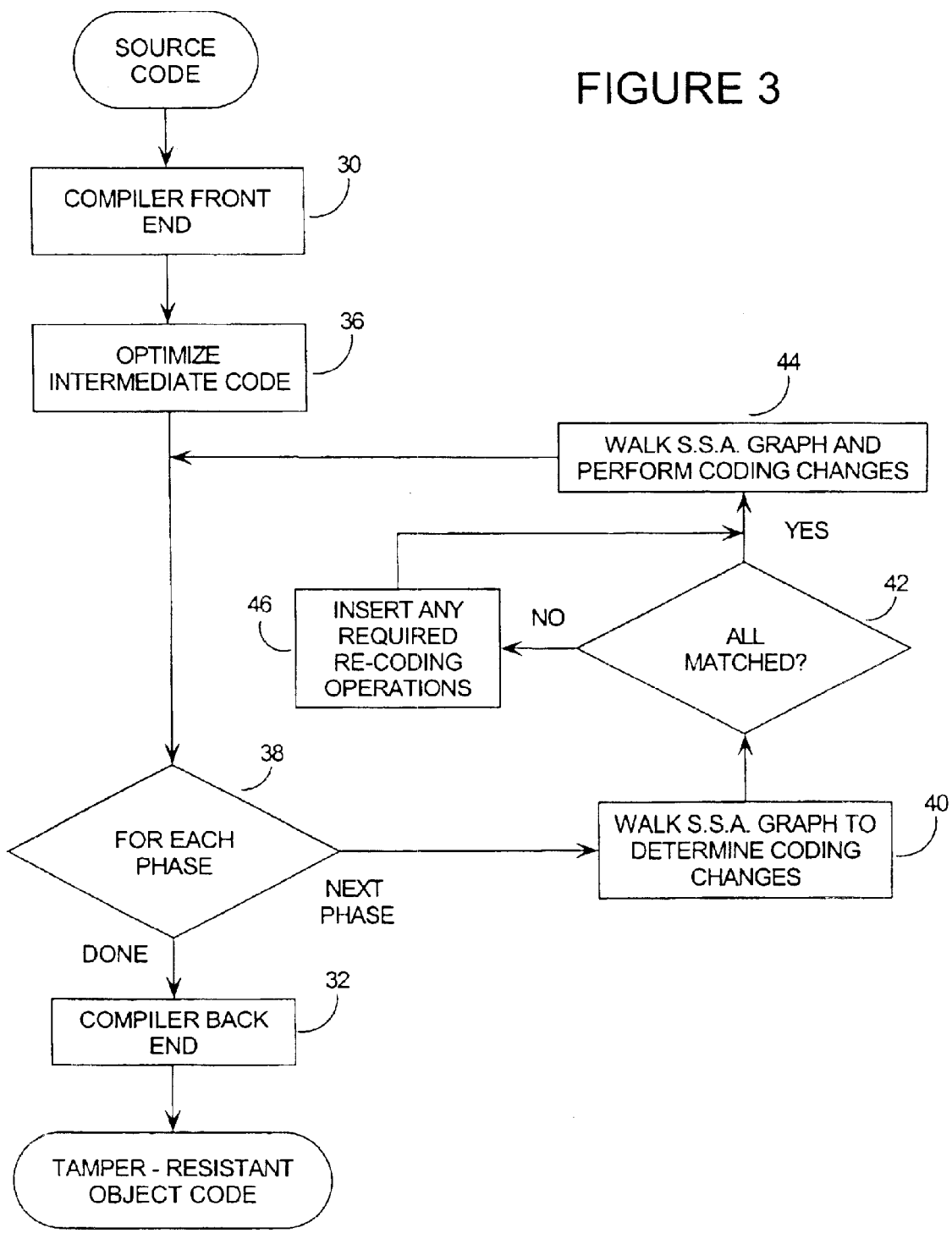
FIG. 3 presents a flow chart of a general algorithm for implementation of the invention.

Preferably, the method of the invention is implemented in the form of a conventional compiler computer program operating on a computer system 10 or similar data processor. As shown in FIG. 3, the compiler program reads an input source program, such as a program written in the C++ programming language, stored in the memory 22 or mass storage 24, and creates a static single assignment intermediate representation of the source code in the memory 22 using the compiler front end 30. A simple example of this compiling into intermediate code follows.

Code Block 1A shows a simple loop in the FORTRAN language, which could form a part of the source program input to the compiler front end 30. Code Block 1B is a static single assignment intermediate representation of code block 1A output from the compiler front end 30. In static single assignment, each virtual register appears in the program exactly once on the left-hand side of an assignment. The label t is used herein to intentionally correspond to the virtual register names of Code Blocks below.

| Code Block 1A<br>(FORTRAN Loop) | | Code Block 1B<br>(Static Single Assignment IR) |
|---|---|---|
| | | % t00 = 0, t01 = 1 |
| | | % t02 = 5, t03 = 50 |
| K = 0 | s0 | t04 = copy(t00) |
| J = 1 | s1 | t05 = copy(t01) |
| DO 10 I = 1, 50 | s2 | t06 = copy(t01) |
| | s10 | t10 = φ (t04, t14) |
| | s11 | t11 = φ (t05, t13) |
| | s12 | t12 = φ (t06, t15) |
| L = J | s3 | t07 = copy(t11) |
| J = J + K | s4 | t13 = iadd(t11,t10) |
| K = L | s5 | t14 = copy(t07) |
| 10 CONTINUE | s6 | t15 = iadd(t12,t01) |
| | s7 | t08 = ile(t15,t03) |
| | s8 | brt(t08,s10) |
| K = J + 5 | s9 | t9 = iadd(t13,t02) |

Except for the initialization steps in the first five lines, each line of Code Block 1B corresponds to a line of source code in Code Block 1A. The sources and destinations for all the operations are virtual registers stored in the memory and labelled t1 to t10. The "iadd" instructions of the above Code Blocks represent CPU integer add operations, the "ile" instruction is an integer less-than-or-equal-to comparison, the "brt" instruction is a "branch if true" operation. Merge nodes are represented by the φ function in the intermediate code statements s10, s11 and s12. The loop of Code Block 1A requires that the backward branch at s8 use the statement number s10 to reference the head of the loop.

Use of Optimizers

Since the invention alters the organization of the software program beyond understanding, a lot of optimization techniques will become ineffective. Therefore, any desired optimization should be done before the tamper-resistant compiling 36 in FIG. 3. Performing optimization after would require the tamper-resistant compiling routine to leave special coding to ensure that the optimization routine does not alter or remove essential coding. This would require a lot of additional code, and would be error-prone. This would also require a new optimization algorithm, as current algorithms do not take account of the special coding. Also, existing analysis techniques such as Data-Flow-Analysis and Alias Analysis may be used to guide the choice of coding scheme by replacing 'worst-case' data-flow connectivity with connectivity closer to reality, so that recodings to achieve matching codings are employed only where really needed. For example, Range Analysis done as part of Data-Flow Analysis can be used to determine how large the bases used in the Residue Number Coding need to be.

General Implementation of Tamper-Resistant Compiling

The tamper-resistant encoding compiler 34 of the invention receives and analyses the internal representation of Code Block 1B. Based on its analysis, the tamper-resistant encoding compiler 34 restructures portions of the intermediate representation, thereby making it fragile to tampering.

In general, the tamper-resistant encoding compiler 34 performs three passes of the intermediate code graph for each phase of encoding, shown in FIG. 3 as steps 38 through 46. In the preferred embodiment of the invention, the popular practice of dividing the compiler into a number of phases, several dozen, in fact, is being followed. Each phase reads the static single assignment graph and does only a little bit of the encoding, leaving a slightly updated static single assignment graph. This makes it easier to understand and to debug. A "phase control file" may be used to specify the ordering of the phases at step 38 and particular parameters of each phase, for added flexibility in ordering phases. This is particularly useful when one phase is to be tested by inserting auditing phases before and/or after it, or when debugging options are added to various phases to aid debugging.

Whenever variable codings are chosen, three passes of the intermediate code graph are generally required. In a first pass, at step 40, the tamper-resistant encoding compiler 34 walks the SSA graph and develops a proposed system of re-codings. If the proposed codings are determined to be acceptable at step 42, which may require a second pass of the SSA graph, control proceeds to step 44, where the acceptable re-codings are then made in a third pass. If the proposed coding is found to contain mismatches at step 42, then recodings are inserted as needed to eliminate the mismatches at step 46.

Once all of the encoding phases have been executed, the resulting tamper-resistant intermediate code is then compiled into object code for storage or machine execution by the compiler back end 32.

This hardening of software has traditionally been thought to be impossible. The usual reasoning is that the attacker can "watch" the program execute, thereby obtaining the complete data-flow and control-flow, so the attacker can undo any protection.

Existing obfuscation techniques do not offer effective protection because they do not hide how the program actually runs. Therefore, existing decompiling tools may observe the software execution and point to the code that the attacker wishes to modify. The invention, however, decouples or dissociates the actual, observable operation from the corresponding software code so that the attacker may not find the corresponding code. This is done by transforming the domain of the data flow into a new domain which does not have a corresponding high level semantic structure. This new method makes it very difficult to fix any reference points for variables in the tamper-resistant program as everything has multiple interpretations.

Because of this dissociation, the invention may be applied to small areas of the input software code. In a typical application, much of the executable code need not be made tamper-resistant since there is no need for it to be secure from tampering. For example, encoding software which creates a bit-mapped graphical user interface (GUI) would be pointless as the information it conveys is immediately evident to the user.

Obfuscation relies solely on "hiding" the organization of the computer software for protection. Existing obfuscators are weak, so a larger portion of the source code must be obfuscated to ensure that some degree of obscurity is achieved in the area of the program requiring protection. The invention, in contrast, provides strong obfuscation, and resists tampering both by obscurity and by extreme induced fragility. Therefore, the invention need only encode the area of the program requiring protection.

This allows the invention to be far more efficient in terms of memory, processing power and execution time. For example, if the source code requires 1 megabyte of memory, but all of the security measures reside in a 5 kilobyte block, tamper-resistant encoding that 5 kilobyte block by an order of 20 times, in the manner of the invention, will only increase the overall size of the input software program by 10%, from 1 megabyte to 1.1 megabytes. In contrast, if it were necessary to apply the process of the invention to all of the source code, a program size increase of 2000%, to 20 megabytes, would result.

The method and system of the invention recognizes that one cannot prevent attackers from making copies and making arbitrary changes. However, the most significant problem is "useful tampering" which refers to making small changes in behaviour. For example, if the trial software was designed to stop working after ten invocations, tampering that changes the "ten" to "hundred" is a concern, but tampering that crashes the program totally is not important.

In operation, the tamper-resistant encoding technique of the invention will work much like a compiler from the user's point of view, although the internal operations are very different. Users may start with a piece of software that is already debugged and tested, run that software through the invention software and end up with new tamper-resistant software. The new tamper-resistant software still appears to operate in the same manner as the original software but it is now hardened against tampering.

Wide Applications

Tamper-resistant encoding in a manner of the invention has very wide possible uses:

1. Protecting the innovation of a software algorithm. For example, if one wished to sell software containing a new and faster algorithm to solve the linear programming problem, one would like to sell the software without disclosing the method.
2. Protecting the innovation of a software model. In hardware design, it is common for vendors of ASIC cell libraries to provide precise software models so that users can perform accurate system simulations. However, it would be desirable to do so without giving away the actual cell design.
3. Wrapping behaviour together. Often, it is desirable to write some software that will perform a function "A" if and only if an event "B" occurs. For example, a certain function is performed only if payment is made.
4. Hiding secrets, such as adding encryption keys or electronic signatures into a program, so that the program can sign things and encrypt/decrypt things, without leaking the key.

Clearly, there are other applications and combinations of applications. For example, an electronic key could be included in a decoder program and the decoding tied to electronic payment, thereby providing an electronic commerce solution.

Properties of Tamper-Resistance

The general approach is that each variable in the software program being encoded, is mapped to some new set of variables, which is cleverly chosen to be not easily reversible to the original. Then, all the arithmetic is performed in the domain of the new set of variables when the program executes.

A number of different techniques are presented herein for effecting this tamper-resistant encoding, which are described as null, polynomial, residual number, bit-exploded, bit-tabulated and custom base coding. These techniques may be applied using a large number of possible codings, as well, these and other coding techniques can be combined. For example, after using the residue number technique, each of the resulting components can be further encoded using the polynomial technique.

These techniques are presented as examples of how the invention may be embodied, and one skilled in the art would be able to identify other similar techniques for effecting the invention. These techniques may be described in terms of the following properties:

1. Anti-Hologram

This property is the opposite of that demonstrated by a hologram. If a piece of a hologram is removed, the whole image of the hologram will still be visible, but in reduced resolution. In contrast, the invention disperses the definition of a single variable into several locations so that a single modification or deletion in any one of those locations will corrupt its value. This property is desirable as it magnifies the detrimental effects of any tampering. Of the techniques described herein, Residue Number, Bit-Explosion and Custom Base have this property.

For example, the assignment:

$$x:=2y+z$$

may be encoded with three different equations stored in different areas of the program as the following assignments:

$$a:=y+2z$$
$$b:=y-z$$
$$x:=a+b$$

In this simple example, the value of variable x will be modified if any of three assignments is modified.

Generally, the sequence in which the assignments are made is significant and is taken into consideration while variables and assignments in the input software program are being encoded.

2. Fake-Robustness

This property describes tamper-resistant encoding which allows a given value to be changed and have the program still run, but because only a limited set of values are actually sensible, certain values will eventually lead to nonsensical computation. It is desirable to maximize the number of encodings that are fake-robust so that a tampered program will not immediately crash. This makes debugging more difficult as the attacker will have to analyse a larger region of code for any change. All of the coding techniques described above, except for the null technique, demonstrate this property.

In the context of tamper-resistance, true robustness would allow the code to be modified somewhat with no change in semantics. Fake robustness does not preserve the semantics of the original software program when modified, so the modified software program continues to execute, but eventually will crash.

For example, if an array A is known to have 100 elements, then converting the expression A[i] to the expression A[i mod 100] makes it fake-robust in that variable i may take on any value and not cause an array bounds error. However, certain values of variable i may cause non-sensical operation elsewhere in the program without causing a complete failure.

3. Togetherness Property

In terms of encoded data flow, this property describes a scenario in which the definition of several variables, preferably from different areas of the program, are arithmetically tied together. Therefore, an attacker cannot alter the encoded program by changing a single value in a single place. This increases the likelihood of any tampering causing a crash in a different area of the program. The degree of togetherness of the coding techniques presented herein, is low with the Polynomial transform technique which has a "1 to 1" correspondence, moderate with Residue Numbers which has "1 to many" correspondence, and high with Custom Base which has a "many to many" correspondence. Note that the degree of togetherness for the polynomial encoding can be increased by splitting up equations as previously shown.

For example, original variables x, y and z, may be encoded into t, u, and v using appropriate functions:

$$t=F_1(x, y, z)$$
$$u=F_2(x, y, z)$$
$$v=F_3(x, y, z)$$

which may be decoded to yield the values of variables x, y and z, using a complementary set of appropriate functions:

$$x=G_1(t, u, v)$$
$$y=G_2(t, u, v)$$
$$z=G_3(t, u, v)$$

When described in terms of these three properties, the custom base technique appears to offer the most tamper-resistant encoding. However, consideration should be made for the resulting impact on run-time expansion, code space expansion, complexity of implementation, probability of requiring recoding and other metrics. Recoding refers to the addition of RECODE operations where mismatches would otherwise occur between proposed encodings.

Each coding technique will have different time/space/complexity trade-offs for different operations. For example, residue number coding can handle large numbers for addition, subtraction and multiplication, but can only handle very restricted forms of division. Most texts state that residue number division is impossible, but the invention applies a method of division where the divisor is part of the residue base.

Several techniques for realizing the invention will now be described.

Null Coding

A null coding is one which does not affect the original software program, that is, the original variable is represented by the same value. There are many places in a program where encoding is not particularly advantageous, for example at the input and output points of the program. As the inputs and outputs may be monitored from a known position outside the program, they are easily identified by an attacker. Rather than addressing the complexity of encoding the inputs and outputs, with little return for the effort, it is more convenient to use a null coding.

Figure 4:
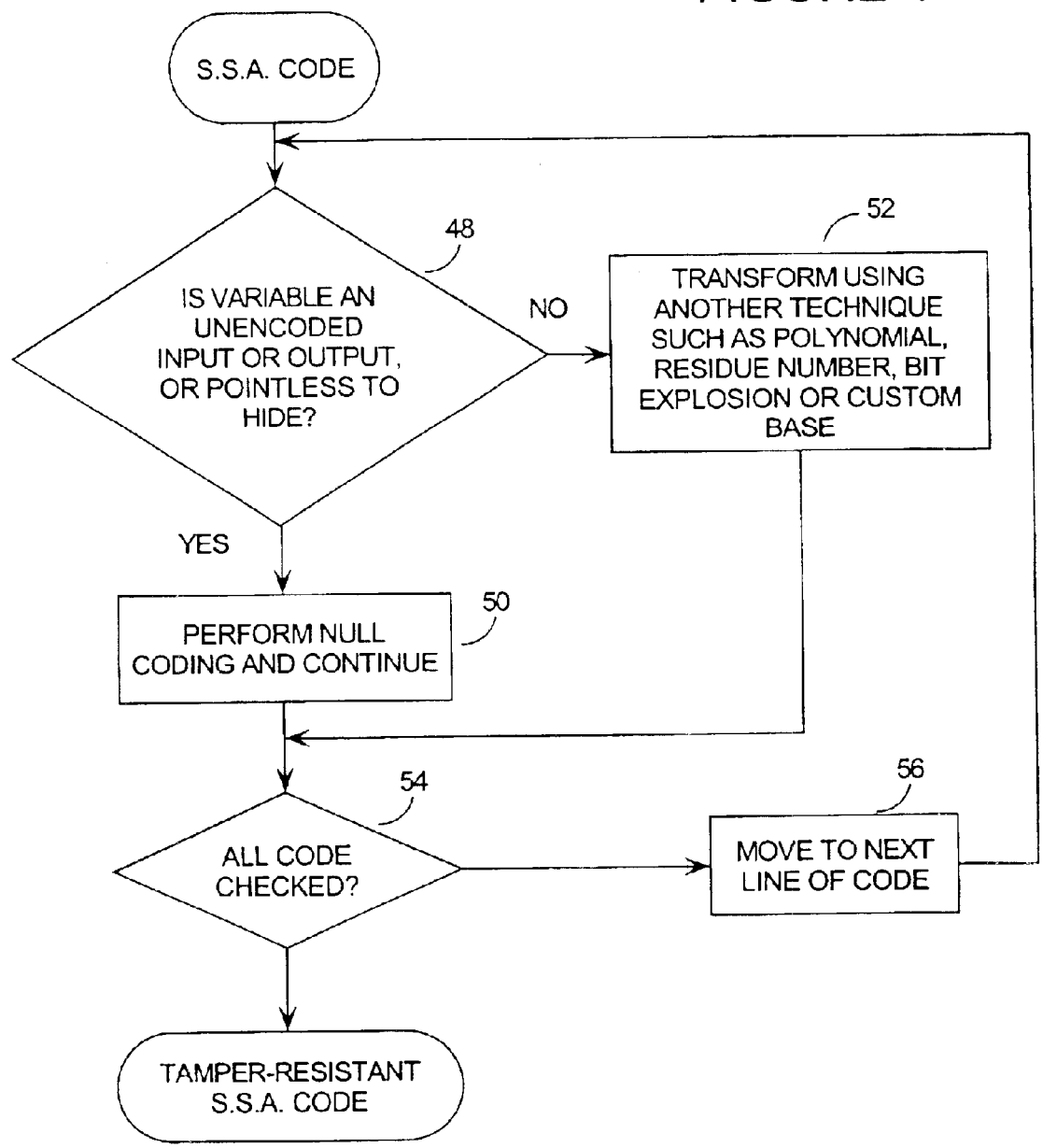
FIG. 4 presents a flow chart of a null coding routine in an embodiment of the invention.

Null coding may be realized by adding a routine as shown in FIG. 4, as one of the phases executed at step 38 of FIG. 3. As the SSA graph is traversed, one analyses each variable, and at step 48, determines whether an identified variables is one which is not to be hidden. As noted above, this may include a variable which is an input, output or otherwise pointless to hide. If so, then a null coding is performed at step 50.

Also, as noted with regard to FIG. 3, this null coding is recorded in the "phase control file". Therefore, if it is determined at step 48 that null coding is not required, the "phase control file" will be made aware at step 52, that another form of coding may be performed.

By use of the decision block at step 54 and stepping through the lines of SSA code at step 56, the balance of the SSA graph is traversed.

Polynomial Coding

The polynomial encoding technique takes an existing set of equations and produces an entirely new set of equations with different variables. The variables in the original program are usually chosen to have meaning in the real world, while the new encoded variables will have no such meaning. As well, the clever selection of constants and polynomials used to define the new set of equations may allow the original mathematical operations to be hidden.

This technique represents a variable x by some polynomial of x, such as ax+b where a and b are some random numbers. This technique allows us to hide operations by changing their sense, or to distribute the definition of a variable around in a program.

A convenient way to describe the execution of the polynomial routine is in terms of a "phantom parallel program". As the polynomial encoding routine executes and encodes the original software program, there is a conceptual program running in parallel, which keeps track of the encodings and their interpretations. After the original software program has been encoded, this "phantom parallel program" adds lines of code which "decode" the output back to the original domain.

For example, if the SSA graph defines the addition of two variables as:

$$z := x - y \quad (1)$$

this equation may be hidden by defining new variables:

$$x' := ax + b \quad (2)$$

$$y' := cy + d \quad (3)$$

$$z' := ez + f \quad (4)$$

Next, a set of random values for constants a, b, c, d, e, and f is chosen, and the original equation (1) in the software program is replaced with the new equation (5).

Note that, in this case, the constant c is chosen to be equal to −a, which hides the subtraction operation from equation (1) by replacing it with an addition operation:

$$z' := x' + y' \quad (5)$$

The change in the operation can be identified by algebraic substitution:

$$z' := a(x-y) + (b+d) \quad (6)$$

Equation (5) is the equation that will replace equation (1) in the software program, but the new equations (2), (3) and (4) will also have to be propagated throughout the software program. If any conflicts arise due to mismatches, RECODE operations will have to be inserted to eliminate them.

In generating the tamper-resistant software, the transformations of each variable are recorded so that all the necessary relationships can be coordinated in the program as the SSA graph is traversed. However, once all nodes of the SSA graph have been transformed and the "decoding" lines of code added at the end, the transformation data may be discarded, including equations (3), (4) and (5). That is, the "phantom parallel program" is discarded, so there is no data left which an attacker may use to reverse engineer the original equations.

Note that a subtraction has been performed by doing an addition without leaving a negative operator in the encoded program. The encoded program only has a subtraction operation because the phantom program knows "c=−a". If the value of the constant had been assigned as "c=a", then the encoded equation would really be an addition. Also, note that each of the three variables used a different coding and there was no explicit conversion into or out of any encoding.

For the case of:

$$y := -x \quad (7)$$

one could chose:

$$x' := ax + b, \text{ and} \quad (8)$$

$$y' := (-a)y + b \quad (9)$$

which would cause the negation operation to vanish, and x and y to appear to be the same variable. The difference is only tracked in the interpretation.

Similarly, for the case of:

$$y := x + 5 \quad (10)$$

one could chose:

$$y' := ax + (b+5) \quad (11)$$

causing the addition operation to vanish. Again, now there are two different interpretations of the same value.

Figure 5:
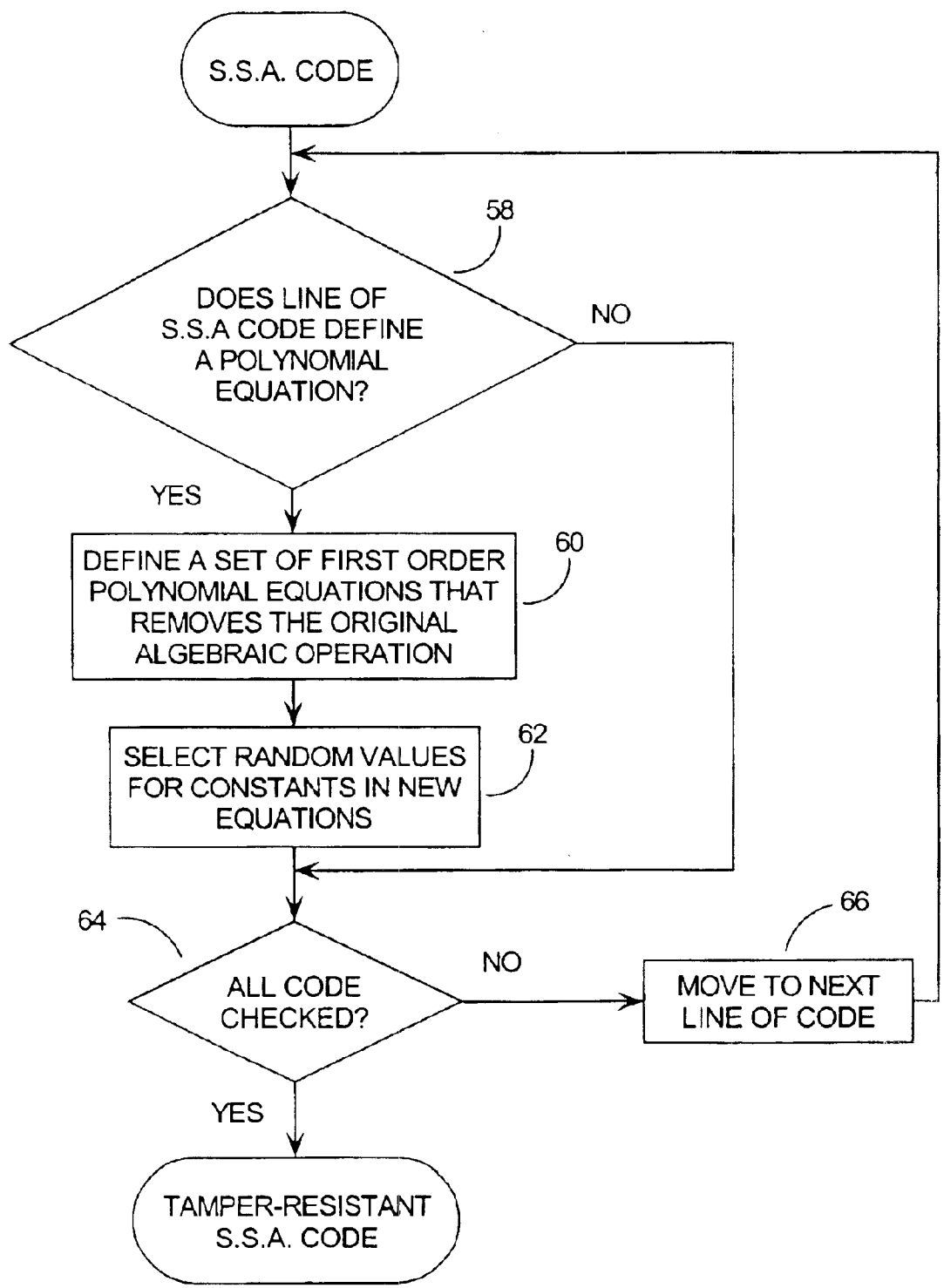
FIG. 5 presents a flow chart of a polynomial encoding routine in an embodiment of the invention.

FIG. 5 presents a simple implementation of the polynomial coding technique. At step 58, a line of the SSA graph is analysed to determine whether it defines a polynomial equation suitable for polynomial encoding. If so, a suitable set of polynomial equations is defined at step 60 that accomplishes the desired encoding. As noted above, this technique is generally applied to physically distribute the definition of a variable throughout a program so a single assignment is usually replaced by a system of assignments distributed throughout the program.

For the simple polynomial scheme, the values of constants are generally unrestricted and the only concern is for the size of the numbers. Values are chosen which do not cause the coded program to overflow. In such a case, the values of constants in these equations may be selected randomly at step 62, within the allowable constraints of the program. However, as noted above, judicious selection of values for constants may be performed to accomplish certain tasks, such as inverting arithmetic operations.

At the decision block of step 64 it is then determined whether the entire SSA graph has been traversed, and if not, the compiler steps incrementally to the next line of code by means of step 66. Otherwise, the phase is complete.

Variations on this technique would be clear to one skilled in the art. For example, higher order polynomials could be used, or particular transforms developed to perform the desired hiding or inversion of certain functions.

Residue Number Coding

This technique makes use of the "Chinese Remainder Theorem" and is usually referred to as "Residue Numbers" in text books (see "The Art of Computer Programming", volume 2: "Seminumerical Algorithms", 1997, by Donald E. Knuth, ISBN 0-201-89684-2, pp. 284–294, or see "Introduction to Algorithms", 1990, by Thomas H. Cormen, Charles E. Leiserson, and Ronald L. Rivest, ISBN 0-262-03141-8, pp. 823–826). A "base" is chosen, consisting of a vector of pairwise relatively prime numbers, for example: 3, 5 and 7. Then, each variable x is represented as a vector of remainders when this variable is operated upon by the "base", that is, x maps on to (x rem 3, x rem 5, x rem 7).

In this scheme, a "Modular Base" consists of several numbers that are pairwise relatively prime. Two distinct integers are said to be relatively prime if their only common divisor is 1. A set of integers are said to be pairwise relatively prime, if for each possible distinct pair of integers from the set, the two integers of the pair are relatively prime.

An example of such a set would be $\{3, 5, 7\}$. In this base, integers can be represented as a vector of remainders by dividing by the base. For example:

```
  0 = (0,0,0),
  1 = (1,1,1),
  5 = (2,0,5),
100 = (1,0,2), and
105 = (0,0,0).
```

Note that this particular base $\{3, 5, 7\}$ has a period of 105, which is equal to the product of 3×5×7, so that only integers inside this range may be represented. The starting point of the range may be chosen to be any value. The most useful choices in this particular example would be [0, 104] or [−52, 52].

If two integers are represented in the same base, simple arithmetic operations may be performed very easily. Addition, subtraction and multiplication for example, may be performed component wise in modular arithmetic. Again, using the base of $\{3, 5, 7\}$:

if: 1 = (1,1,1) and

5 = (2,0,5), then

1 + 5 = ((1 + 2) mod 3, (1 + 0) mod 5, (1 + 5) mod 7)

= (0,1,6).

Of course, 1+5=6, and 6 in residue form with the same base is (0, 1, 6). Subtraction and multiplication are performed in a corresponding manner.

Heretofore, division had been thought to be impossible, but can be done advantageously in a manner of the invention. First, however, it is of assistance to review the method of solving for the residue numbers.

Converting from an integer to a corresponding Residue Number is simply a matter of dividing by each number in the base set to determine the remainders. However, converting from a Residue Number back to the original integer is more difficult. The solution as presented by Knuth is as follows. Knuth also discusses and derives the general solution, which will not be presented here:

For an integer "a" which may be represented by a vector of residue numbers $(a_1, a_2, \ldots a_k)$:

$$a = (a_1 c_1 + a_2 c_2 + \ldots + a_k c_k)(\bmod n) \quad (12)$$

where:

$a_i = a(\bmod n_i)$ for $i=1, 2, \ldots, k$ and:

$n = n_1 \times n_2 \times \ldots \times n_k$ and:

$$c_i = m_i(m_i^{-1} \bmod n_i) \text{ for } i=1, 2, \ldots, k \quad (13)$$

and:

$$m_i = n/n_i \text{ for } i=1, 2, \ldots, k \quad (14)$$

and where the notation "$(x^{-1} \bmod y)$" used above denotes that integer z such that xz (mod y)=1. For example, $(3^{-1} \bmod 7)$=5 because 15 (mod 7)=1, where 15=3×5.

In the case of this example, with a base (3, 5, 7), a vector of solution constants, (c3=70, c5=21, c7=15), are calculated. Once these constants have been calculated, converting a residue number (1, 1, 1) back to the original integer is simply a matter of calculating:

$$r_1 c_1 + r_2 c_2 + r_3 c_3 = 1 \times 70 + 1 \times 21 + 1 \times 15 = 106 \quad (15)$$

assuming a range of [0,104], multiples of 105 are subtracted yielding an integer value of 1.

Most texts like Knuth discuss Residue Numbers in the context of hardware implementation or high-precision integer arithmetic, so their focus is on how to pick a convenient base and how to convert into and out of that base. However, in applying this technique to the invention, the concern is on how to easily create many diverse bases.

In choosing a basis for Residue Numbers, quite a few magic coefficients may be generated dependent on the bases. By observation of the algebra, it is desirable to have different bases with a large number of common factors. This can be easily achieved by having a list of numbers which are pairwise relatively prime, and each base just partitions these numbers into the components. For example, consider the set $\{16, 9, 5, 7, 11, 13, 17, 19, 23\}$, comprising nine small positive integers which are either prime numbers or powers of prime numbers. One can obtain bases for residual encoding by taking any three distinct elements of this set. This keeps the numbers roughly the same size and allows a total range of 5,354,228,880 which is sufficient for 32 bits. For example, one such base generated in this manner might be $\{16*9*11, 5*13*23, 7*17*19\}=\{1584, 1495, 2261\}$.

The invention allows a system of many bases with hidden conversion between those bases. As well, it allows the solution constants to be exposed without exposing the bases themselves. The original bases used to convert the software to residue numbers are not required to run the software, but would be required to decode the software back to the original high level source code. The invention allows a set of solution constants to be created which may run the software, without exposing the original bases. Therefore, the solution constants are of no assistance to the attacker in decoding the original software, or reverse engineering it.

To hide the conversion of a residue number, r, defined by a vector of remainders ($r_1, r_2, \ldots r_n$) derived using a base of pairwise relatively prime numbers ($b_1, b_2, \ldots b_n$), a vector of solution constants are derived as follows. Firstly, using the method of Knuth, a vector of constants ($c_1, c_2, \ldots c_k$) may be determined which provides the original integer by the calculation:

$$r = (r_1 c_1 + r_2 c_2 + \ldots + r_k c_k)(\bmod b_i) \tag{16}$$

where $b_i$ is the ith number in the vector of pairwise relatively prime numbers $\{b_1, b_2, \ldots b_n\}$. As each of the corresponding $r_1, r_2, \ldots r_n$ are residues, they will all be smaller than $b_i$, therefore equation (16) may be simplified to:

$$r_i = (c_1 \bmod b_i) \times r_1 + (c_2 \bmod b_i) \times r_2 + \ldots + (c_k \bmod b_i) \times r_n \tag{17}$$

Each component ($c_i \bmod b_j$) will be a constant for a given basis, and can be pre-calculated and stored so that the residue numbers can be decoded, and the software executed, when required. Because the vector of ($c_i \bmod b_j$) factors are not relatively prime, they will have common factors. Therefore, the base $\{b_1, b_2, \ldots b_n\}$ can not be solved from knowledge of this set of factors. Therefore, storing this set of solution constants with the encoded software does not provide the attacker with any information about the old or the new bases.

Division of Residue Numbers

Most texts like Knuth also indicate that division is impossible. However, the invention provides a manner of division by a constant.

In order to perform division by a constant using residue numbers, the divisor must be one of the numbers of the base:

Let: the base be $\{b_1, b_2, \ldots b_n\}$, the divisor be $b_i$, which is a member of the set $\{b_1, b_2, \ldots b_n\}$, and the quotient be $\{q_1, q_2, \ldots, q_n\}$.

Then, to calculate $q_j$ (where i is not j):

$$q_j = (c_j/b_i \bmod b_j)^* r_j + (c_i - 1)/b_i \bmod b_i^* r_i \tag{19}$$

The algebraic derivation is straightforward, by symbolically performing the full decoding and division. The key is the observation that all the other terms vanish due to the construction of the $c_j$'s To calculate $q_i$, the terms do not vanish, so a computation must be made of:

$$q_i = (c_1/b_i \bmod b_i)^* r_1 + \ldots + (c_n/b_i \bmod b_i)^* r_n \tag{20}$$

This equation does not take account of the range reduction needed, so a separate computation is used to calculate the number of times the range has been wrapped around, so that the proper value may be returned:

$$w_i = [(c_1/b_i) \times r_1 + \ldots + (c_n/b_i) \times r_n]/(rangeSize/b_i) \times (rangeSize/b_i) \tag{21}$$

Therefore, the decoded integer value becomes:

$$x = q_i + (rangeSize/b_i) \times w_i \tag{22}$$

Figure 6:
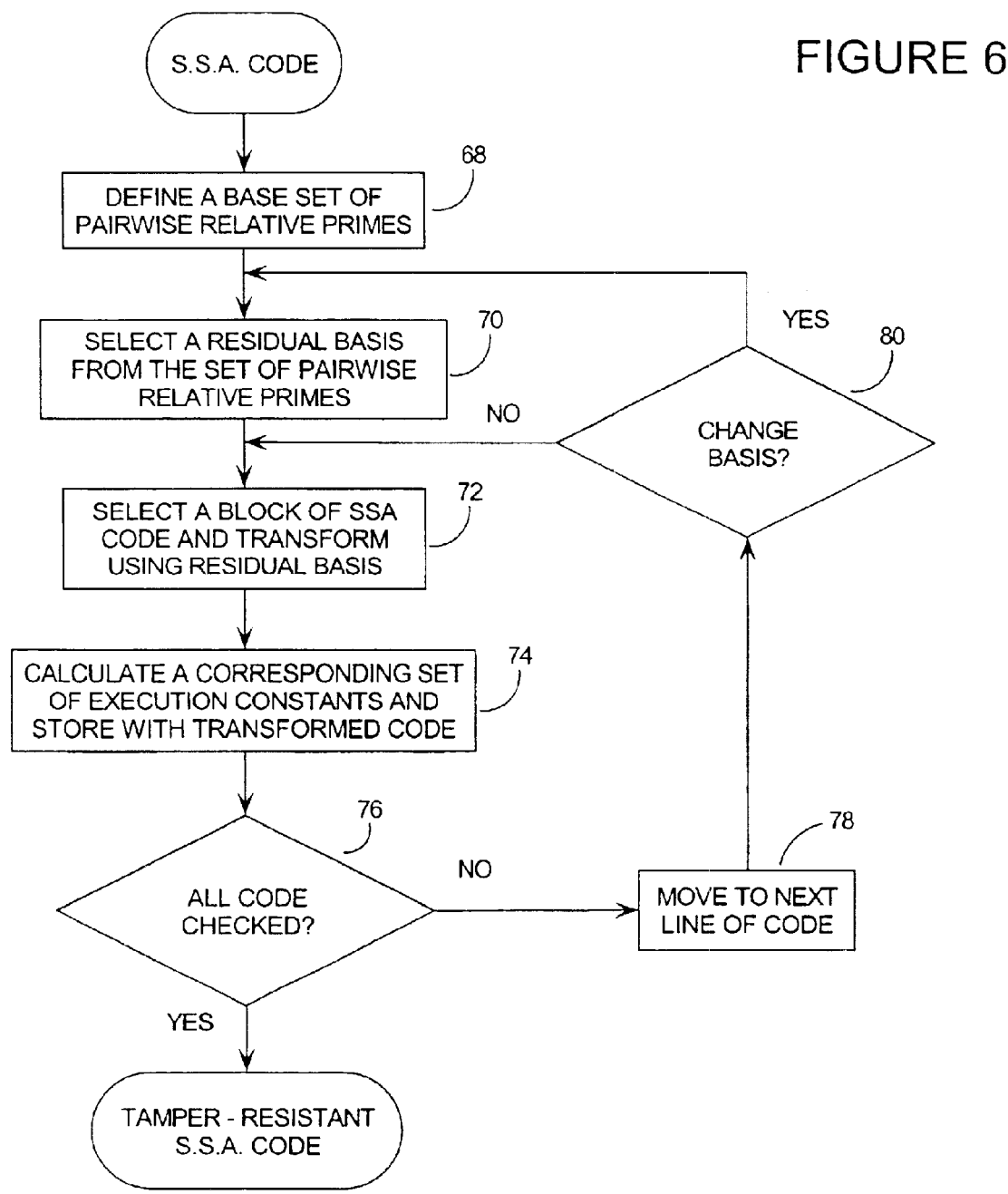
FIG. 6 presents a flow chart of a residue number encoding routine in an embodiment of the invention.

FIG. 6 presents a flow chart of a simple implementation of a Residue Number encoding phase, in a preferred embodiment of the invention. The routine begins at step 68 by establishing a base set of pairwise relative primes, for example, the set of $\{16, 9, 5, 7, 11, 13, 17, 19, 23\}$ as presented above. At step 70, a base is computed from this set as previously described, such as $\{1584, 1495, 2261\}$. A suitable block of software code is selected from the SSA graph and is transformed into residual form at step 72. If operators are found which are not calculable in the residue domain, then they will be identified in the phase control file, and those operators and their associated variables will be encoded using a different technique. At step 74, a corresponding set of solution constants is then calculated and is stored with the tamper-resistant program. As noted above, these solution constants are needed to execute the program, but do not provide the attacker with information needed to decode the tamper-resistant program.

At step 76, a decision block determines whether the entire SSA graph has been traversed, and if not, the compiler steps incrementally to the next line of code by means of step 78. At step 80, a determination is made whether to select a new basis from the set of pairwise relative primes by returning to step 70, or to continue with the same set by returning to step 72. Alternatively, one could return to step 68 to create a completely new base set, though this would not generally be necessary.

Once the decision block at step 76 determines that the SSA graph has been traversed, the phase is complete.

Bit Exploded Coding

Like the residue number coding above, the bit-exploded coding technique encodes one virtual register (VR) or other variable into multiple VRs or other variables.

The idea is to convert one n-bit variable into n Boolean variables. That is, each bit of the original variable is stored in a separate and new Boolean variable. Each such new Boolean variable is either unchanged or inverted by interchanging true and false. This means that for a 32-bit variable, there are $2^{32}$, a little over 4 billion, bit-exploded codings to choose from.

This encoding is highly suitable for code in which bitwise Boolean operations, constant shifts or rotations, fixed bit permutations, field extractions, field insertions, and the like are performed. Shifts, rotations, and other bit rearrangements have no semantic equivalent in high-level code, since they specifically involve determining which bits participate in which Boolean operations.

For other Boolean operations, the complement operation, which takes a complemented input (if unary) or two complemented inputs (if binary) and returns a complemented result, is clear by application of de Morgan's laws, so dealing with the inversion of some of the variables in the bit-exploded representation is straightforward. Recall that de Morgan's first law states that: not ((not x) and (not y))=x or y, and second law states that: not ((not x) or (not y))=x and y. In general, if op is a binary operation, it is desirable to use the operation op2 such that:

x op2 y=not ((not x) op (not y))

Examples would be that the complement of the and operation is or, and the complement of the or operation is and. The same strategy applies to other operations as well.

For bit-wise Boolean operations, either the operation or its complement on each bit is performed. For example, if a 4-bit variable x has been exploded into 4 Boolean variables a, b, c, d, with a and d uninverted and b and c inverted, then where y has similarly been encoded as a', b', c', d' and z is to be encoded similarly as a'', b'', c'', d'', the operation:

z=x and y may be performed by computing:

a"=a and a' b"=b or b' c"=c or c' d"=d and d' since the or operation is the complement of the and operation, and it is the b and c components of each variable which are complemented.

This encoding results in a substantial increase in the number of operations relative to the original program, except for operations which can be "factored out" because they can be done by reinterpreting which variables represent which bits or which bits are in the representation are inverted.

Some of this expansion may be avoided by using the optimization routine described hereinbelow.

Figure 7:
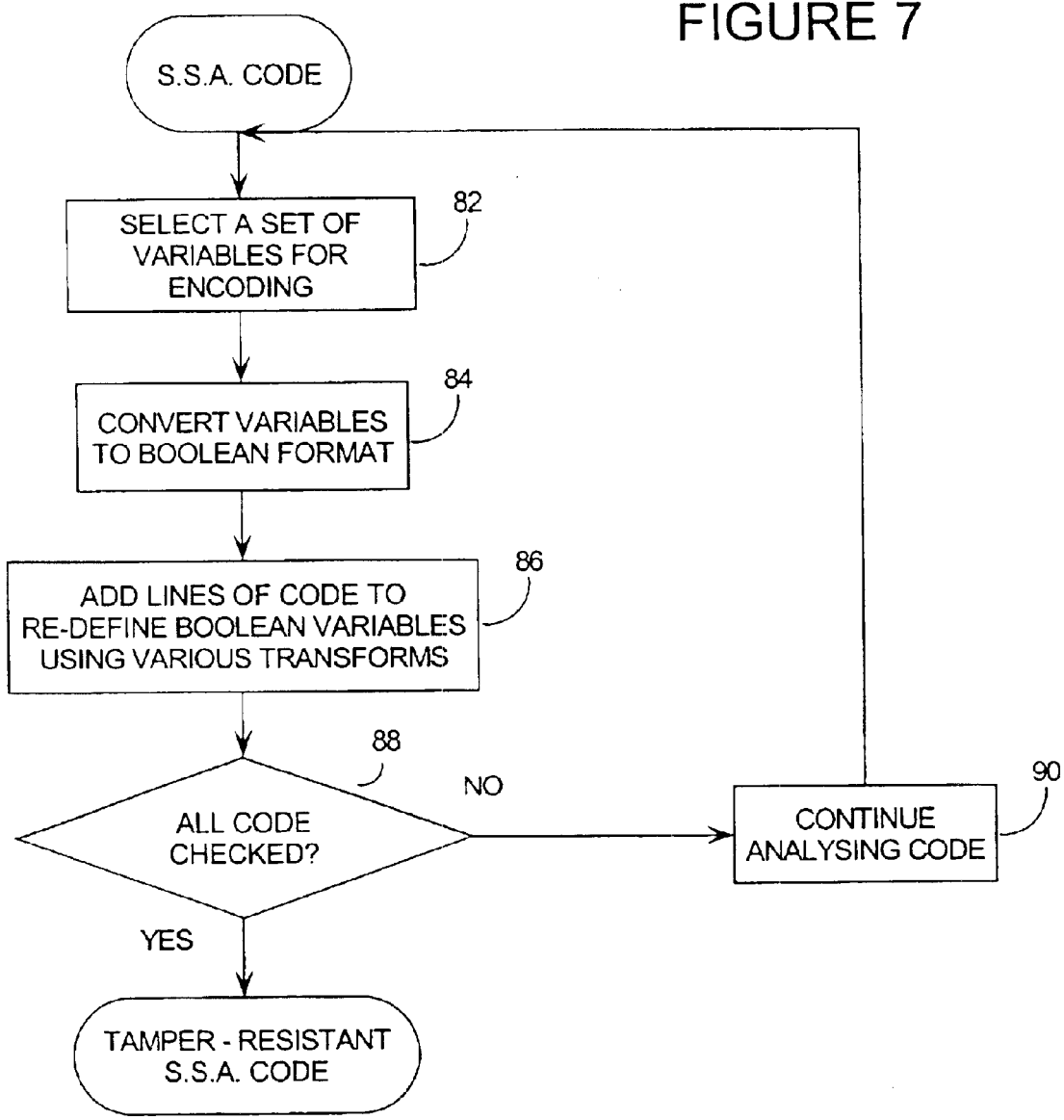
FIG. 7 presents a flow chart of a bit-explosion coding routine in an embodiment of the invention.

FIG. 7 presents a flow chart of an exemplary implementation of bit-exploded encoding. The routine begins at step 82, where a variable or set of variables is identified for boolean encoding. At step 84, a corresponding set of boolean variables is defined for each original variable. Additional lines of software code are then added at step 86 to redefine the new boolean variables using shifts, rotations, inversions and other transforms as described hereinabove. These variables and their transforms are recorded in the "phantom parallel program", so that the outputs of the program can be rationalised when required. Note that variables which are completely internal to the program, may never be rationalised in this manner.

At step 88, a decision block determines whether the entire SSA graph has been traversed, and if not, the compiler steps incrementally to the next variable, line of code, or block of code, by means of step 90. If the entire SSA graph, or at least the target SSA code has been traversed, the phase is complete.

An Optimization: Bit-Tabulated Coding

In the bit-exploded technique described above, the resulting code may be excessively bulky and slow to execute. However, an optimization may be performed which reduces these inefficiencies.

Bit-exploded coding may produce data-flow networks having subnetworks with the following properties:

they have only a reasonably small number of inputs; and they are acyclic; that is, contain no loops.

When this occurs, one can replace the entire network or subnetwork with a table lookup. This results from the fact that an m-input, n-output Boolean function can be represented by a zero-origin table of $2^m$ n-bit elements. Instead of including the network in the final encoded program, it is simply replaced with a corresponding table lookup, in which one indexes into the table using the integer index formed by combining the m inputs into a non-negative integer, obtaining the n-bit result, and converting it back into individual bits. Note that the positions of the bits in the index and the result of the above lookup can be random, and the network can be previously encoded using the bit-exploded coding, so the encoding chosen for the data is not exposed.

It is desirable that the number of inputs to the table be small, to keep the table from becoming excessively large. However, for anything up to eight inputs, and sometimes for as many as 12, this is a viable approach, and can result in substantial savings of memory space and/or increased speed in execution compared to bit-exploded encoding.

Moreover, bit-tabulated encoding is compatible with bit-exploded encoding, and it is preferable to combine the two techniques where opportunities occur.

The Reverse Transformation: Bit-Tabulated to Bit-Exploded

The bit-tabulation encoding is an optimization of bit-exploded coding. Sometimes it is useful to perform the reverse of this transformation. That is, to transform a table-lookup with the above-described characteristics into a network of Boolean operations. This is straightforward, and algorithms for converting from such tables into such networks can be found in many books on circuit theory, for example, *Switching Theory*, by Paul E. Wood, Jr., McGraw-Hill Book Co., 1968, Library of Congress Catalog Card Number 68-11624.

An example where this reverse transformation is useful is when one wishes to disguise the tables. For example, one may convert from the bit-tabular form to the bit-exploded form, which involves the injection of random bit inversions, and then when optimization converts parts of the code back into bit-tabular form, the tables are drastically disguised and changed. Thereby, this provides an effective means for data-coding small tables used in table lookup operations.

For example, one may hide Data Encryption Standard (DES) Keys using Bit-Exploded and Bit-Tabulated coding. DES is currently the most widely known and studied encryption algorithm. Moreover, triple-DES variants of DES continue to be suitable forms of encryption even in quite secure applications.

The DES algorithm is well suited for a combination of the bit-exploded and bit-tabular encodings. By performing tamper-resistant data-encoding on a routine with an embedded constant key, which performs DES encryption, for example, a tamper-resistant software routine may be produced which still performs DES encryption, but for which extraction of the key is a very difficult task. This extraction is particularly difficult it a fully-unrolled implementation is used, that is, one in which the 16 rounds of DES are separated into individual blocks of code instead of being implemented by a loop cycling 16 times. Such unrolling can easily be performed with a text editor prior to execution of the tamper-resistant encoding.

This is clear from consideration of the DES algorithm. The entire DES encryption process consists of small shifts, bit permutations or bit transforms very similar to permutations, and lookups in small tables called S-boxes which are already in the ideal form for the bit-tabular to bit-exploded form mentioned above.

For example, given a subroutine which computes DES, in which the key is embedded in the routine body as a constant, so that it computes DES for only this one key, and in which the loop representing the 16 'rounds' of DES has been unrolled, either by unrolling it at the source level, or by applying aggressive loop unrolling to unroll the rounds in the code optimizer, this routine may be encoded according to the method of the invention as follows:

1. The entire routine is encoded using the bit-exploded encoding, and using the conversion from bit-tabular to bit-exploded on the S-boxes.

Note that the small shifts, word splits, and permutations disappear as they are simply re-interpretations of the identities of the Booleans. This is only true with the unrolled version where the shift for each round is a constant.

At this point, the code contains excessive bulk, but may be reduced.

2. The code produced above is now reduced using conventional constant folding. The effect is that the key has now completely disappeared, but the code bulk remains excessively large.

3. Further encoding is now performed by recoding using the bit-exploded to bit-tabular optimization.

A completely different set of S-boxes has now been produced which bears no discoverable relation to the original ones and correspond only to the encoded data. The positions of the bits, and to some extent even which part of the computation has been assigned to which S-box, is now radically changed.

The same process can be used to create a routine which performs the corresponding decryption.

The above method for hiding DES keys may not be particularly useful on its own, since an attacker with access to the encryption and decryption routines could simply use the routines themselves, instead of the keys, to achieve what could otherwise have achieved by knowing the keys. However, if DES or triple-DES is embedded in a larger program, use of the control-flow encoding in concert with data-flow encoding in a manner of the invention, makes the above technique highly useful, since it is then no longer possible to extract the encryption and decryption routines in isolation.

There are many uses for software applications which embed and employ a secret encryption key without making either the key or a substitute for the key available to an attacker. The method of the invention can generally be applied to these applications.

Custom Base Coding

As noted above, custom based coding provides the optimal tamper-resistance in view of the three targeted properties: anti-hologram, fake-robustness and togetherness. However, this performance is at the expense of memory and necessary processing power. Therefore, it may be desirable to only use this technique in certain portions of the target program, and to use techniques which are less demanding of system resources in other areas of the target.

In broad terms, this coding technique is a variable transform in a custom coordinate space. For example, values defined on an (x, y) coordinate space could be transformed onto a (x−y, x+y) coordinate space. Such a transformation would give the visual impression of a 45° rotation. Of course, this coding transformation may also be n-dimensional, so the visual analogy to 2 dimensions is a limited analogy. Note that the vectors need not be orthogonal, but they must be independent in order to span the vector space. That is, if there are n vectors, they must form the basis for a n-dimensional vector space.

For a simple example, variable "x" is grouped with some other variables such as "y" and "z", that may be part of the program or decoy variables that have been created. Then an invertible map to some other set of variables is created. This technique basically treats x, y, z as basis vectors in some coordinate space, and the mapping is just the change to a different basis.

In the same manner as the polynomial and bit-transform techniques, the details of the custom base transformation are not required to execute the program, so they may be discarded once it is complete. Therefore, there are no secrets left in the executable tamper-resistant program that an attacker may use to decode it.

If this transform was executed on a single equation, it would be possible to identify what has been done, and to reverse the transformation. However, with multiple equations, the inverse transformation would be very difficult to calculate. As well, there are additional degrees of freedom which increase the complexity, and reduce the tracibility by orders of magnitude. For example:

1. Variables need not be grouped with other variables that have either related function or location. In fact, it is desirable to use disparate variables as an attacker would be less likely to look towards diverse and unrelated areas of the program for interdependency.
2. Decoy variables may be added to the SSA graph and included in the transform. A particular area of a software program, for example, the copy protection area, may be made the focus of this coding technique. Since the code in the copy protection area of the software program is rarely executed, this technique could be used to add 10,000 or so operations to this area. The user would not generally be inconvenienced by the additional fraction of a second it would take to execute the tamper-resistant copy protection code, or the 40 kilobytes or so of memory it would require. An attacker, however, would not be able to decode these operations using traditional reverse-engineering techniques and would have to analyse them by hand. Therefore, this method would have tremendous utility for tamper-resistance.
3. It is also straightforward to scale this coding technique to handle n-dimensions. This creates a large matrix of interdependent equations, spread throughout diverse areas of the tamper-resistant software program. This way, a small change in one area of the program may have consequences in many other areas. An attacker would not be able to identify which areas would be affected by a given change.
4. The bases for the custom-base codings may be changed almost continuously as the tamper-resistant software is compiling, provided that the tamper-resistant compiler remembers the encodings, so that the operation and outputs of the tamper-resistant software remain coordinated.

Figure 8:
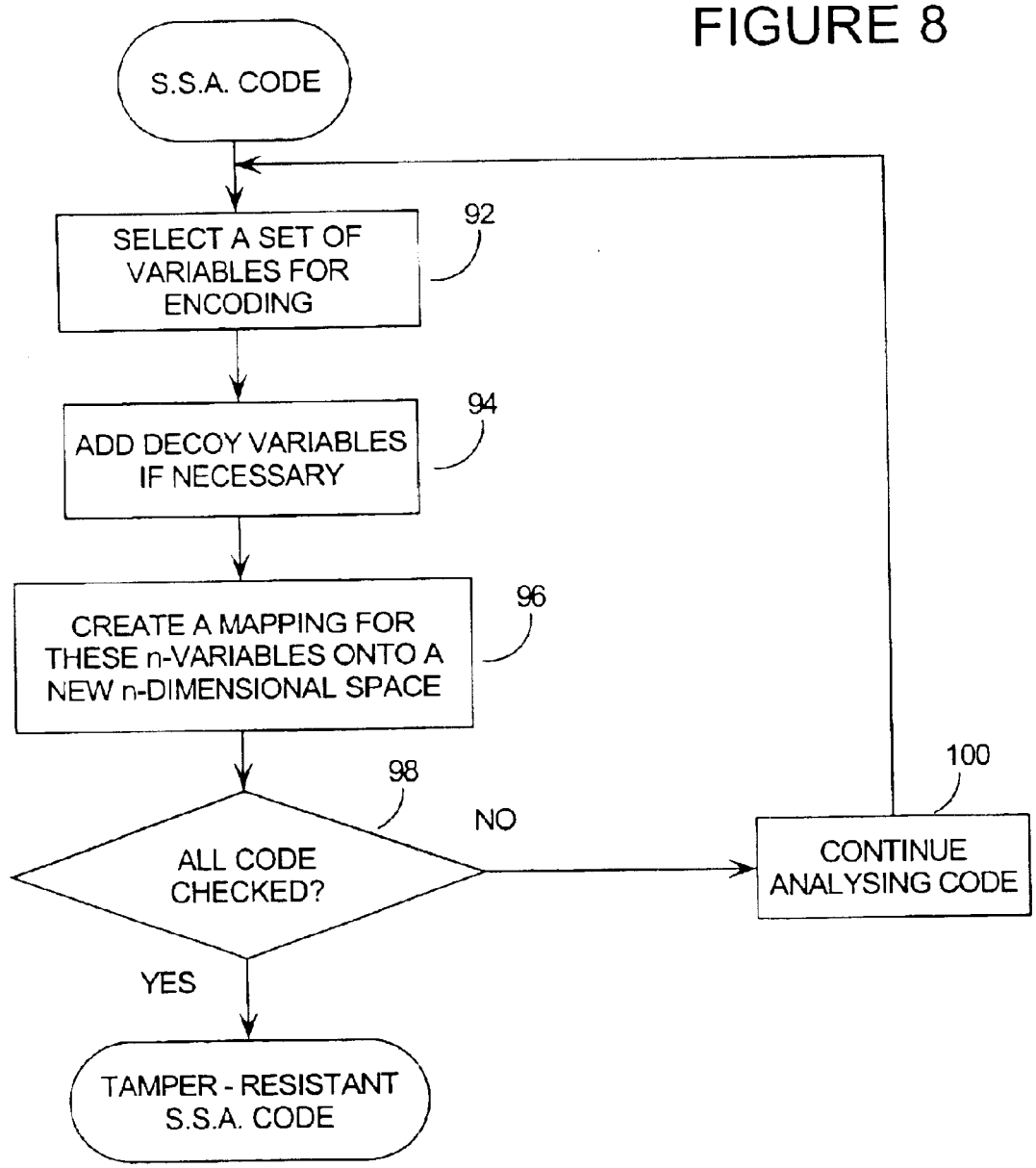
FIG. 8 presents a flow chart of a custom base coding routine in an embodiment of the invention.

FIG. 8 represents a simple application of this technology in a preferred embodiment of the invention. The routine begins at step 92, where a variable or set of variables is identified for custom base encoding. At step 94, decoy variables are added if necessary, bringing the number of variables to n. At step 96, additional lines of software code are then added to map these n variables onto a new n-dimensional space. These variables and their transforms are recorded in the "phantom parallel program", so that the outputs of the program can be rationalised when required. Note that variables which are completely internal to the program, may never be rationalised in this manner.

At step 98, a decision block determines whether the entire SSA graph has been traversed, and if not, the compiler continues to analyse the SSA graph, by means of step 100. When the entire SSA graph, or the at least the target SSA code has been traversed, the phase is complete.

Choosing Random Numbers

For all the coding schemes, a large number of random numbers are required. For repeatability to aid debugging, Pseudo-Random numbers may be advantageously used. Given that a large number of random numbers are required and are used in many ways, truly random numbers such as those produced from radioactive decay, are not necessary, but would offer increased tamper-resistance. Presently, computer peripheral devices for the generation of truly random bits using random electronic fluctuations are commercially available.

The more interesting question is how to pick the coefficients and bases for the various codings. The particulars of those selection strategies are outlined in the discussion of the techniques themselves.

Preferred Implementation

It is not sufficient merely to pick random codings, but the codings must be selected and coordinated so that each producer and consumer agree on the interpretation/coding at every point. As described above, there are instances where the program is such that a given selection will not nicely line up everything and a new coding must be selected using a Recode operation.

Figure 9A:
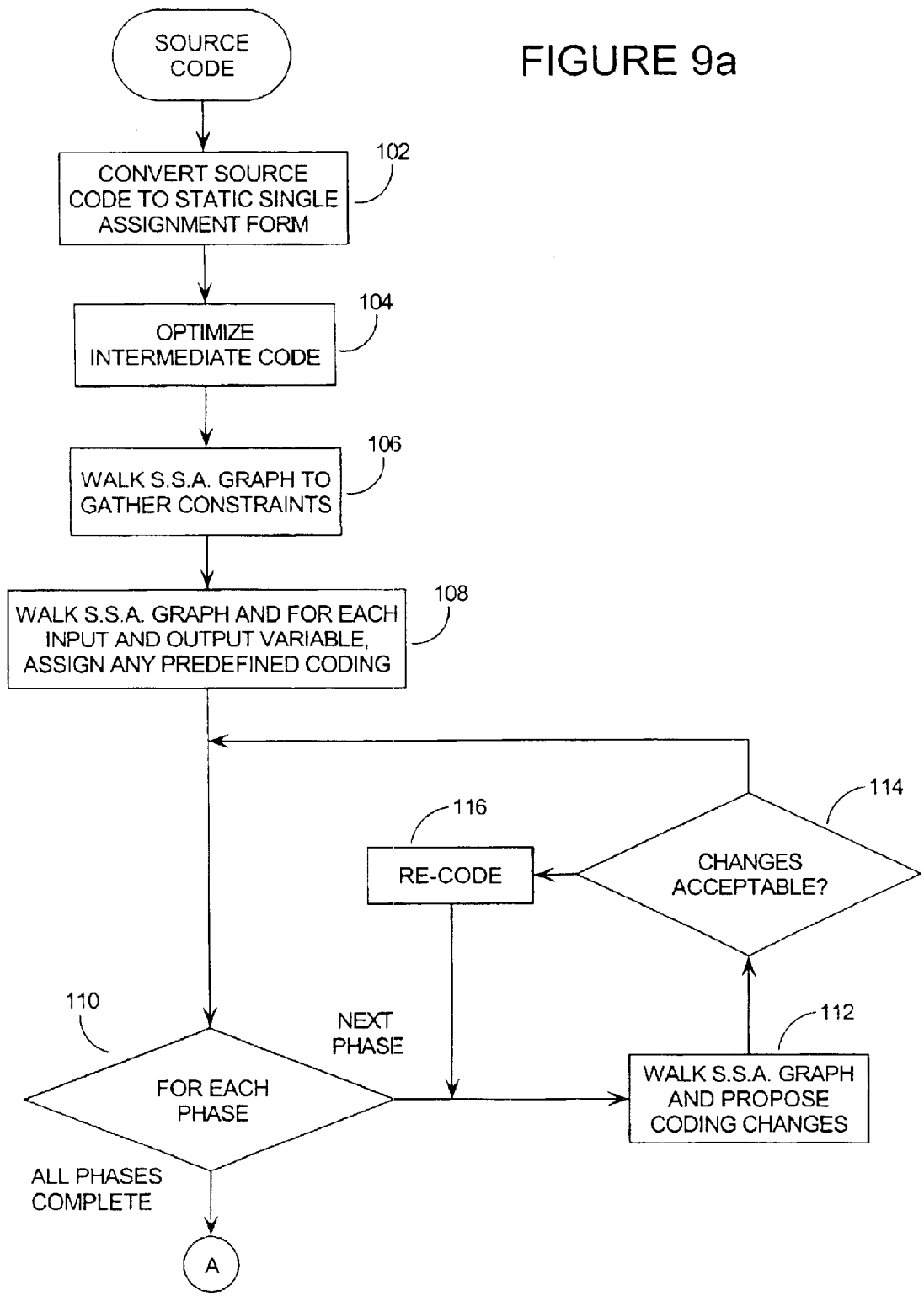
FIGS. 9a and 9b present a flow chart of the preferred embodiment of the invention.
Figure 9B:
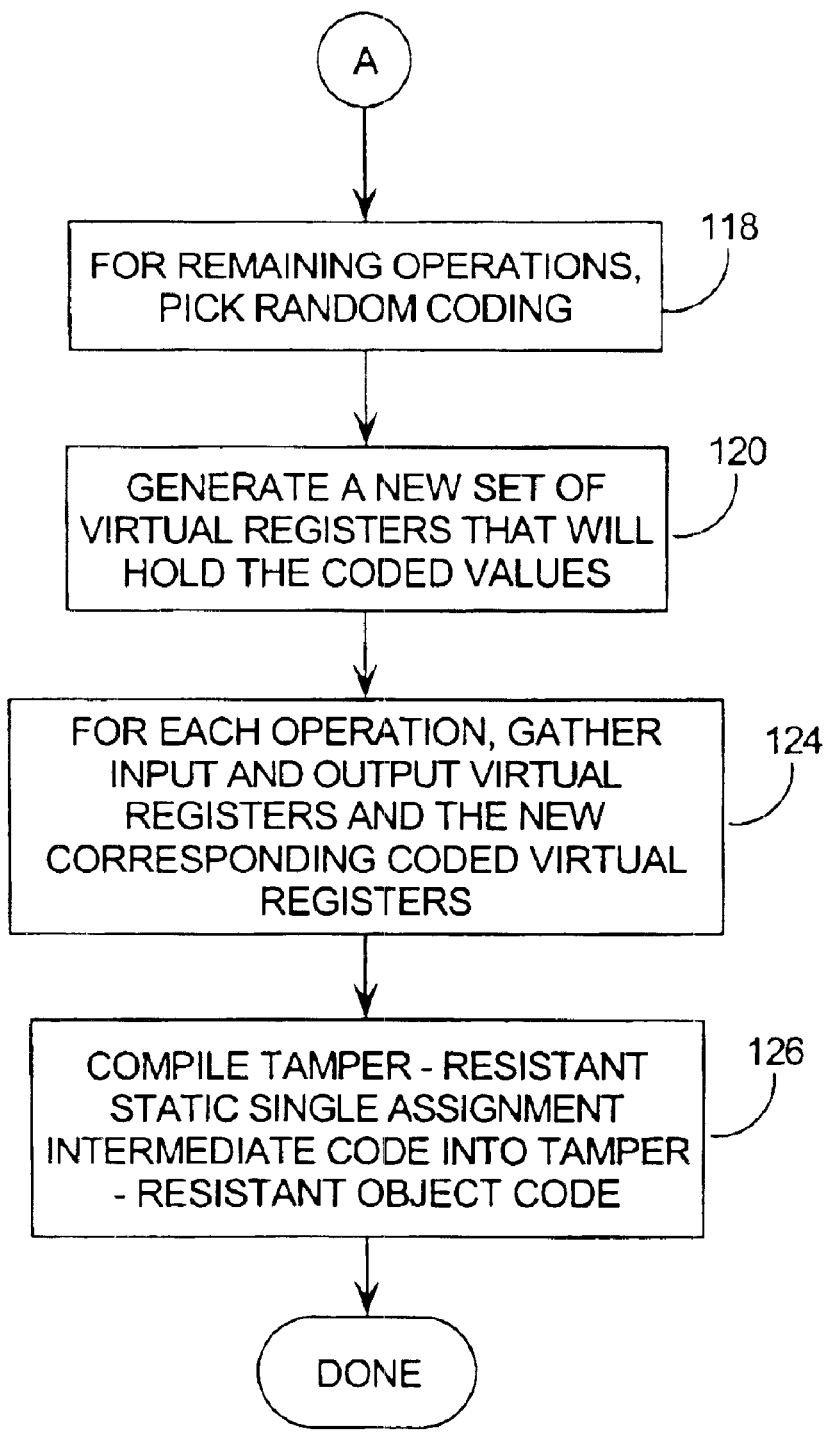

There are many different ways to implement the invention, keeping in mind that the goal is to minimize the times that data appear "in the plain" and to avoid outputting the magic numbers into the scrambled program. One very simple way is to divide the work into several phases, first assigning codings, then actually perform the changes. An example of such as implementation is presented in the flow chart of FIGS. 9a and 9b, which presents the following steps:

1. Compile the original program into static single assignment form at step 102 of FIG. 9a. As noted above, it is prefered to execute this steps using a standard compiler front end suitable to the application.
2. Optionally, optimize the intermediate code at step 104.
3. Walk the SSA graph to gather constraints at step 106. Examples of such constraints would include:
    a. identifying "merge" nodes. In static single assignment a merge node does nothing, but requires that all its/ input/output have the same coding;
    b. if a divide by a constant is chosen to be coded using the residue number technique, then the divisor must be part of the base; and
    c. identifying input and output variables.
4. For each of the input and output variables, assign any pre-defined coding at step 108. Also, variables whose values are inherently exposed m-ay also be Null coded. For example, if the outcome of a comparison will either be True of False, it is difficult to hide the behaviour of any boolean branch which employs it, so there is no advantage in tamper protecting it. There may however, be instances where there is an advantage to encoding such a comparison, for example, if the control flow is to be encoded in some manner.
5. As noted above, it is preferred to perform the tamper-resistant techniques in many phases to reduce possibility of error and improve the ease of trouble-shooting. Steps 110 through 116 are performed until each desired phase has been completed, which is determined at the decision point 110. As noted above, the coordination of the phases is administered by a "phase control file".
6. Walk the S.S.A. graph at step 112 to propagate a proposed set of virtual register codings into a phantom parallel program. If a virtual register has a coding, then examine its producer operation and consumer operations to propagate the encoding and generate new encodings where required. When the first virtual register reaches an operation, assign coding for that operation, which will usually assign codings to all its input/output virtual registers.
7. The decision block at step 114 identifies inconsistencies or unallowable conditions in a proposed encoding which would cause it to be disallowed. In such a circumstance, control passes to step 116 to propose and analyse a new coding. If a coding is allowed, control passes back to step 110 for the next phase to be performed.
8. For operations that are left, some random, but allowable, coding may be chosen and propagated to its input and output virtual registers at step 118 of FIG. 9b.
9. For each virtual register, which now all have a coding stored in the phantom parallel program, generate a new set of virtual registers to contain the coded values at step 120. For codings like Custom Base, several original virtual registers will map into the same set of new virtual registers.
10. For each operation, gather the associated input and output virtual registers and the corresponding new coded virtual registers at step 122. Expand the operation into whatever is required. In the preferred embodiment, this is done using a dedicated language to help perform the mapping between original and coded virtual registers, but that is merely a matter of programming convenience.
11. The tamper-resistant intermediate code is then compiled into tamper resistant object code using a standard compiler back end 32. As a refinement, prior to the conversion to a specific executable object code in the back end 32, one may take individual instructions and move each to one or more new locations, where permitted by their data flow and control flow dependencies. This increases the extent to which the encoded software exhibits the togetherness and anti-hologram properties.

The preferred routine is then complete.

While particular embodiments of the present invention have been shown and described, it is clear that changes and modifications may be made to such embodiments without departing from the true scope and spirit of the invention. For example, rather than using the encoding techniques described, alternate techniques could be developed which dissociate the observable execution of a program from the code causing the activity.

It is understood that as de-compiling and debugging tools become more and more powerful, the degree to which the techniques of the invention must be applied to ensure tamper protection, will also rise. As well, the concern for system resources may also be reduced over time as the cost and speed of computer execution and memory storage capacity continue to improve.

These improvements will also increase the attacker's ability to overcome the simpler tamper-resistance techniques included in the scope of the claims. It is understood, therefore, that the utility of some of the simpler encoding techniques that fall within the scope of the claims, may correspondingly decrease over time. That is, just as in the world of cryptography, increasing key-lengths become necessary over time in order to provide a given level of protection, so in the world of the instant invention, increasing complexity of encoding will become necessary to achieve a given level of protection.

As noted above, it is also understood that computer control and software is becoming more and more common. It is understood that software encoded in the manner of the invention is not limited to the applications described, but may be applied to any manner of the software stored, or executing.

The method steps of the invention may be embodiment in sets of executable machine code stored in a variety of formats such as object code or source code. Such code is described generically herein as programming code, or a computer program for simplification. Clearly, the executable machine code may be integrated with the code of other programs, implemented as subroutines, by external program calls or by other techniques as known in the art.

The embodiments of the invention may be executed by a computer processor or similar device programmed in the manner of method steps, or may be executed by an electronic system which is provided with means for executing these steps. Similarly, an electronic memory means such computer diskettes, CD-Roms, Random Access Memory (RAM), Read Only Memory (ROM) or similar computer software storage media known in the art, may be programmed to execute such method steps. As well, electronic signals representing these method steps may also be transmitted via a communication network.

It would also be clear to one skilled in the art that this invention need not be limited to the existing scope of computers and computer systems.

Credit, debit, bank and smart cards could be encoded to apply the invention to their respective applications. An electronic commerce system in a manner of the invention could for example, be applied to parking meters, vending machines, pay telephones, inventory control or rental cars and using magnetic strips or electronic circuits to store the software and passwords. Again, such implementations would be clear to one skilled in the art, and do not take away from the invention.

What is claimed is:

1. A method of increasing the tamper-resistance and obscurity of computer software code comprising the steps of:

transforming the data flow of said computer software code to dissociate the observable operation of the transformed said computer software code from the intent of the original software code;

thereby rendering said computer software code resistant to tampering, yet still executable in the same environments as the unprotected form of said computer software code.

2. The method of claim 1, wherein said step of transforming comprises the steps of:

producing new software code which depends critically on constraints, so any modification results in erroneous operation.

3. The method of claim 1, wherein said step of transforming comprises:

encoding intermediate computer software code into tamper-resistant intermediate computer software code having a domain which does not have a corresponding semantic structure, to increase the tamper-resistance and obscurity of said computer software code;

and further comprising:

a prior step of compiling said computer software program from source code into a corresponding set of intermediate computer software code; and a subsequent step of compiling said tamper-resistant intermediate computer software code into said tamper-resistant computer software object code.

4. The method of claim 1 wherein said step of transforming comprises the step of:

transforming a system of equations that define the data flow of at least part of said computer software code, to a new and coordinated system of equations that dissociate the observable operation of the transformed said computer software code from the original intent, and to render it resistant to tampering.

5. The method of claim 4 wherein said step of encoding comprises dispersing the definition of a variable into a plurality of locations, to dissociate the observable operation of said computer software code from said computer software code while being executed.

6. The method of claim 5, further comprising the subsequent step of:

moving selected individual instructions to new locations permitted by their data flow and control how dependencies.

7. The method of claim 6, wherein said step of dispersing comprises:

redefining a variable using a technique selected from the group of:

residue coding; bit-explosion; bit-residue; and custom base coding.

8. The method of claim 4 wherein said step of encoding comprises:

defining a first variable in said computer software code in terms of a second variable in said computer software code, so that modification of said second variable modifies the value of said first variable.

9. The method of claim 8 wherein said step of encoding comprises:

defining a plurality of variables in terms of one another, so that modification of any one of said variables will after the definition of all of said plurality of variables.

10. The method of claim 9, wherein said step of defining comprises:

redefining a variable using a technique selected from the group of:

polynomial coding; residue coding; bit-explosion; bit-residue; and custom base coding.

11. The method of claim 8, wherein said step of transforming comprises the step of:

minimizing the appearance of the data in their original form.

12. The method at claim 4 wherein said step of transforming comprises the step of:

transforming a system of equations that define the data flow in at least part at said computer software code, to a new and coordinated system of equations, which act as a plan, for the dissociation of the observable operation of the transformed said computer software code from the original intent, and to render it resistant to tampering.

13. The method of claim 12, wherein said step of transforming comprises the steps of:

analysing a system of equations that define the data flow in at least part of said computer software code; and developing a new and coordinated system of equations that dissociate the observable operation of the transformed said computer software code from the original intent and to render it resistant to tampering; followed by the step of transforming said system of equations in accordance with said new and coordinated system of equations.

14. The method of claim 13, further comprising the step of:

optimizing said transformed system of equations.

15. The method of claim 12, wherein said stop of transforming comprises the steps of:

first assigning new codings to said system of equations; followed by the step of performing changes to said system of equations to affect said new codings.

16. The method of claim 4 wherein said step of transforming comprises the step of:

transforming a system of equations that define the data flow of at least part of said computer software code, in view of all graph-wide constraints, to a new and coordinated system of equations that dissociate the observable operation of the transformed said computer software code from the original intent, and to render it resistant to tampering.

17. The method of claim 16 wherein said step of transforming comprises the step of:

randomly varying arguments within bounds that will not cause a failure, whereby small modifications will cause nonsensical computations without immediate failure.

18. The method of claim 16 where said step of transforming further comprises the step of:

proposing a new and coordinated system of equations that dissociate the observable operation of the transformed said computer software code form the original intent, and to render it resistant to tampering;

traversing said at least part of the data flow graph of said computer software code to collect constraints on said new and coordinated system of equations; and replacing said original system of equations with said proposed new and coordinated system of equations.

19. The method of claim 16 wherein said step of transforming comprises the steps of:

traversing at least part of the data flow graph of said computer software code to identify a system of equations that define said data flow;

proposing a new and coordinated system of equations that dissociate the observable operation of the transformed said computer software code from the original intent, and to render it resistant to tampering;

traversing said at least part of the data flow graph of said computer software code to identify mismatches between said original system of equations and said proposed new and coordinated system of equations; and responding to a determination that there are no mismatches by:

traversing said at least part of the data flow graph of said computer software code to replace said original system or equations with said proposed new and coordinated system of equations.

20. The method of claim 19, further comprising the step of:

responding to a determination that mismatches exist by:

re-coding said proposed new and coordinated system or equations to eliminate said mismatches.

21. The method of claim 16 wherein said step of transforming comprises the step of:

encoding said computer software code such that minor changes will result in nonsensical operation when the encoded software is executed, without causing the encoded software to immediately fail.

22. The method of claim 21 wherein said step of transforming further comprises the step of:

determining where said transformed computer software code would trap and modifying code to perform nonsensical operation rather than trapping.

23. The method of claim 21, wherein said step of encoding comprises the step of:

defining an individual variable in said computer software code as a plurality of new variables.

24. The method of claim 23 wherein said step of encoding comprises:

responding to a line of code defining a polynomial equation by:

redefining each variable in said polynomial equation by a new polynomial equation; and selecting random values of constants in said new polynomial equations.

25. The method of claim 24 wherein said step of selecting comprises selecting values of constants in said new polynomial equations to invert the sense of an arithmetic operation in said polynomial equation.

26. The method of claim 25 wherein:

said step of redefining comprises redefining each variable in said polynomial equation by a new first order polynomial equation; and said step of selecting comprises selecting values of constants in said new first order polynomial equations to invert the sense of an arithmetic operation in said first order polynomial equation.

27. The method of claim 23, wherein said step or encoding comprises:

defining an n-bit variable as a corresponding set of n-boolean variables.

28. The method of claim 27, further comprising the step of:

adding lines of code to invert selected ones of said corresponding set of n-boolean variables.

29. The method of claim 28, further comprising the step of:

responding to the data flow of said computer software code being acyclic, by replacing said corresponding set of n-boolean variables with a table lookup.

30. The method of claim 29, where step of responding comprises the step of:

responding to the data flow of said computer software code having a reasonably small number of inputs and being acyclic, by replacing said corresponding set of n-boolean variables with a table lookup.

31. The method of claim 21, wherein said step of encoding comprises the step of:

defining many variables or constants in said software code as many new equations, where each new variable depends on all old variables.

32. The method of claim 31 wherein said step of encoding comprises:

generating and storing a set of relatively prime factors; and transposing said computer software program by calculating residues based on said set of relatively prime factors.

33. The method of claim 32, further comprising the steps of:

calculating a corresponding set of execution constants which may be used to execute said encoded computer software program; and storing said set of execution constants with said encoded computer software program.

34. The method of claim 33 wherein said step of transposing comprises selecting a block of SSA code and transposing said block at SSA code into a corresponding set of residual code by calculating residues based on said set of relatively prime factors.

35. The method of claim 32 wherein said step of encoding comprises:

mapping a set of n-variables into a new n-dimensional, custom coordinate space.

36. The method of claim 35 wherein said step of mapping comprises:

mapping a set of n-independent variables into a new n-dimensional coordinate space defining a rotation of said set of n-independent variables from the original coordinate space.

37. The method of claim 32 wherein said step of encoding comprises:
   responding to a line of code defining a polynomial equation by:
   redefining each variable in said polynomial equation by a new polynomial equation; and
   selecting random values of constants in said new polynomial equations.

38. The method of claim 37 wherein said stop of selecting comprises selecting values of constants in said new polynomial equations to invert the sense of an arithmetic operation in said polynomial equation.

39. The method of claim 38 wherein:
   said step of redefining comprises redefining each variable in said polynomial equation by a new first order polynomial equation; and
   said slop of selecting comprises selecting values of constants in said new first order polynomial equations to invert the sense of an arithmetic operation in said first order polynomial equation.

40. The method of claim 21, wherein said step of encoding comprises the step of:
   defining many variables or constants in said software code as one now variable.

41. The method of claim 40, further comprising the step of:
   responding to the data flow of said computer software code being acyclic, by replacing a set of n-boolean variables with a corresponding table lookup.

42. The method of claim 21, further comprising the step of:
   responding to the data flow of said computer software code having a reasonably small number of inputs and being acyclic, by replacing said set of n-boolean variables with said corresponding table lookup.

43. The method of claim wherein said step of encoding comprises the step of:
   modifying selected expressions in said computer software code to allow a broader range of values for variables so that certain operations on the variables will execute without errors, some of the lime, without causing the encoded software to immediately fail.

44. The method of claim 21 further comprising the step of:
   adding code to said computer software code to allow variables to have a broader range of values without causing out of range errors.

45. The method of claim 44, wherein said steps of encoding and adding code comprise:
   redefining a variable using a technique selected from the group of: polynomial coding; residue coding; bit-explosion; bit-residue; and custom base coding.

* * * * *